(12) United States Patent
Matsumoto et al.

(10) Patent No.: US 12,174,044 B2
(45) Date of Patent: Dec. 24, 2024

(54) LINEAR POSITION SENSOR

(71) Applicant: DENSO CORPORATION, Kariya (JP)

(72) Inventors: Yuki Matsumoto, Kariya (JP); Tsukasa Kono, Kariya (JP); Atsushi Kobayashi, Kariya (JP); Tetsuya Ohmi, Kariya (JP); Michihiro Makita, Kariya (JP); Naoki Watanabe, Kariya (JP); Sukhwa Jung, Kariya (JP)

(73) Assignee: DENSO CORPORATION, Kariya (JP)

( * ) Notice: Subject to any disclaimer, the term of this patent is extended or adjusted under 35 U.S.C. 154(b) by 114 days.

(21) Appl. No.: 18/147,246

(22) Filed: Dec. 28, 2022

(65) Prior Publication Data

US 2023/0160723 A1 May 25, 2023

Related U.S. Application Data

(63) Continuation of application No. PCT/JP2021/024290, filed on Jun. 28, 2021.

(30) Foreign Application Priority Data

Jul. 10, 2020 (JP) .................................. 2020-119274
Jun. 16, 2021 (JP) .................................. 2021-100394

(51) Int. Cl.
*G01D 5/14* (2006.01)
*G01D 5/16* (2006.01)
(52) U.S. Cl.
CPC ............... *G01D 5/145* (2013.01); *G01D 5/16* (2013.01)

(58) Field of Classification Search
CPC .................................. G01D 5/16; G01D 5/145
See application file for complete search history.

(56) References Cited

U.S. PATENT DOCUMENTS

| | | | |
|---|---|---|---|
| 2007/0114990 A1* | 5/2007 | Godkin | ................. G01D 5/145 324/207.2 |
| 2010/0090689 A1 | 4/2010 | Furuki et al. | |
| 2010/0231205 A1* | 9/2010 | Jerance | ................. G01D 5/145 324/207.23 |
| 2011/0133724 A1 | 6/2011 | Fukuoka et al. | |

(Continued)

FOREIGN PATENT DOCUMENTS

| | | |
|---|---|---|
| JP | H7-128566 A | 5/1995 |
| JP | 2019-143991 A | 8/2019 |
| JP | 2019-152640 A | 9/2019 |

*Primary Examiner* — Stephanie E Bloss
*Assistant Examiner* — Michael A Harrison
(74) *Attorney, Agent, or Firm* — Posz Law Group, PLC

(57) ABSTRACT

Magnets are arranged at intervals along a stroke direction with an interposed space. Magnetic pole surfaces of adjacent ones of the magnets have opposite poles. A detector is arranged with a gap in a gap direction against a magnetic pole surface of each of the magnets and acquires a sine signal and a cosine signal as detection signals of phases corresponding to the positions of the magnets, based on a change in a magnetic field received from the magnets according to movement of the detector relative to the detection object in the stroke direction. A signal processor acquires the sine signal and the cosine signal from the detector, generates, based on the sine signal and the cosine signal, an arctangent signal corresponding to a stroke amount of the detection object relative to the detector, and acquires the arctangent signal as a position signal.

14 Claims, 31 Drawing Sheets

(56) References Cited

U.S. PATENT DOCUMENTS

| | | | |
|---|---|---|---|
| 2014/0176131 A1* | 6/2014 | Lackey | G01D 5/145 |
| | | | 324/247 |
| 2021/0140800 A1* | 5/2021 | Ishikawara | G01D 5/145 |
| 2023/0160723 A1 | 5/2023 | Matsumoto et al. | |

* cited by examiner

STROKE DIRECTION

STROKE DIRECTION a# LINEAR POSITION SENSOR

CROSS REFERENCE TO RELATED APPLICATION

The present application is a continuation application of International Patent Application No. PCT/JP2021/024290 filed on Jun. 28, 2021, which designated the U.S. and claims the benefit of priority from Japanese Patent Applications No. 2020-119274 filed on Jul. 10, 2020 and No. 2021-100394 filed on Jun. 16, 2021. The entire disclosures of all of the above applications are incorporated herein by reference.

TECHNICAL FIELD

The present disclosure relates to a linear position sensor.

BACKGROUND

Conventionally, a known position detection device includes a magnetic detection element and a plurality of magnetic members having magnetic pole surfaces facing the magnetic detection element.

SUMMARY

According to an aspect of the present disclosure, a linear position sensor detects a position of a detection object in a stroke direction. The detection object is organized such that a plurality of magnets are spaced apart along the stroke direction, and adjacent magnetic pole surfaces of the plurality of magnets have opposite poles.

BRIEF DESCRIPTION OF THE DRAWINGS

The above and other objects, features and advantages of the present disclosure are more clearly understood from the following detailed description with reference to the accompanying drawings. In the accompanying drawings.

DETAILED DESCRIPTION

Figure 1:
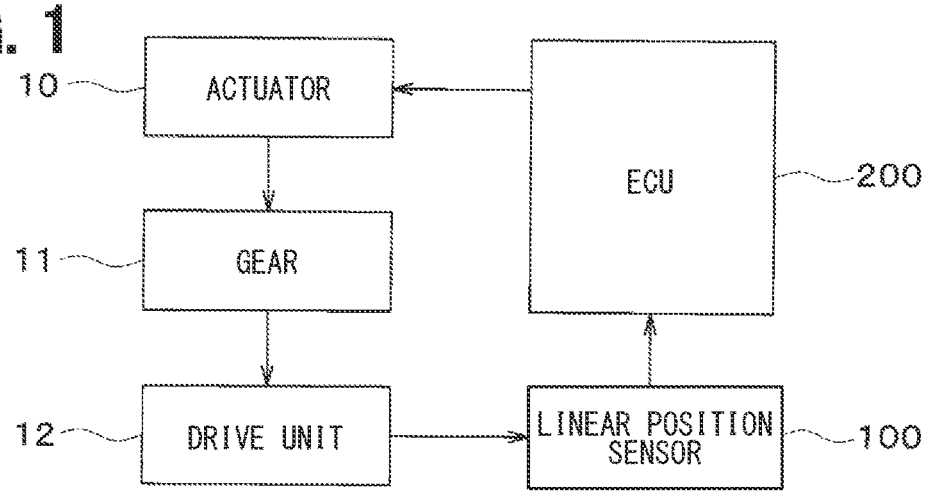
FIG. 1 is a configuration diagram of a system using a linear position sensor according to a first embodiment.

Hereinafter, examples of the present disclosure will be described.

According to an example of the present disclosure, a position detection device includes a magnetic detection element and a plurality of magnetic members having magnetic pole surfaces facing the magnetic detection element. The magnetic pole surfaces of adjacent magnetic members have opposite polarities. Further, the adjacent magnetic members are spaced apart from each other and arranged at equal intervals.

The magnetic detection element and the magnetic members move relative to each other within a stroke range along an arrangement direction of the magnetic members. The magnetic detection element acquires two-phase output signals that are shifted by 90 degrees. The size of the magnetic members and the pitch of the magnetic members are adjusted to ensure or guarantee detection accuracy over an entire stroke range.

Detection accuracy may be required to have a certain detection accuracy level in a specific range or at a specific position in the entire stroke range. The range or position where the detection accuracy is required within the entire stroke range is an accuracy-required range or an accuracy-required position.

In an assumable configuration, the size of the respective magnetic members and the pitch of the respective magnetic members are adjusted to be the same in order to ensure the detection accuracy of the entire stroke range. In this assumable configuration, it may be difficult to selectively improve the detection accuracy of the accuracy-required range within the entire stroke range.

According to an example of the present disclosure, the linear position sensor detects a position of a detection object in a stroke direction. The detection object is organized such that a plurality of magnets are spaced apart along the stroke direction, and adjacent magnetic pole surfaces of the plurality of magnets have opposite poles. A linear position sensor includes a detector and a signal processor.

The detector is arranged with a gap in a gap direction with respect to magnetic pole surfaces of the plurality of magnets. The detector acquires a sine signal representing a sine function and a cosine signal representing a cosine function, as detection signals of phases corresponding to the positions of the plurality of magnets, based on a change in a magnetic field received from the plurality of magnets according to a movement of the detector relative to the detection object in the stroke direction.

The signal processor acquires the sine signal and the cosine signal from the detector. The signal processor generates, based on the sine signal and the cosine signal, an arctangent signal representing an arctangent function and corresponding to a stroke amount of the detection object relative to the detector, and acquires the arctangent signal as a position signal that indicates a position of the detection object.

According to the above, by changing the configuration of the detection object, it becomes possible to adjust magnetic fields received by the detector from the plurality of magnets. Therefore, it is possible to not only improve the detection accuracy of the entire stroke range, but also selectively improve the detection accuracy in the accuracy-required range or at the accuracy-required position within the entire stroke range.

The following describes plural embodiments for carrying out the present disclosure with reference to the drawings. In each of the embodiments, matters corresponding to the ones already described in the preceding embodiments are given reference numbers identical to reference numbers of the matters already described, and the same description is therefore omitted depending on circumstances. In a case where only a part of the configuration is described in an embodiment, for the rest of such embodiment, the configuration of the preceding embodiment is applicable. The present disclosure is not limited to combinations of embodiments which are explicitly described as combinable, but may also include combinations of embodiments not explicitly described as combinable.

First Embodiment

Hereinafter, the first embodiment is described with reference to the drawings. The linear position sensor according to the present embodiment is a sensor that detects a position of a detection object in a stroke direction. The detection object is, for example, a movable component mounted on a vehicle. Hereinafter, the linear position sensor is simply referred to as a sensor.

As shown in FIG. 1, a sensor 100 is adopted in a system for controlling a speed reducer in a vehicle. The speed reducer includes an actuator 10, a gear 11 and a drive unit 12. The actuator 10 is controlled by an ECU (Electronic Control Unit) 200. The actuator 10 rotates the gear 11 of the speed reducer under the control of the ECU 200. The drive unit 12 is a component that operates by the rotation of the gear 11. The drive unit 12 includes a detection object that moves in a certain stroke range.

The sensor 100 detects a current position of the detection object moving along the stroke direction. Specifically, the sensor 100 detects the current position of the detection object by acquiring a signal proportional to a stroke amount of the detection object. The ECU 200 acquires the current position of the detection object from the sensor 100. The ECU 200 feeds a detection result of the sensor 100 back to a control of the actuator 10.

Figure 2:
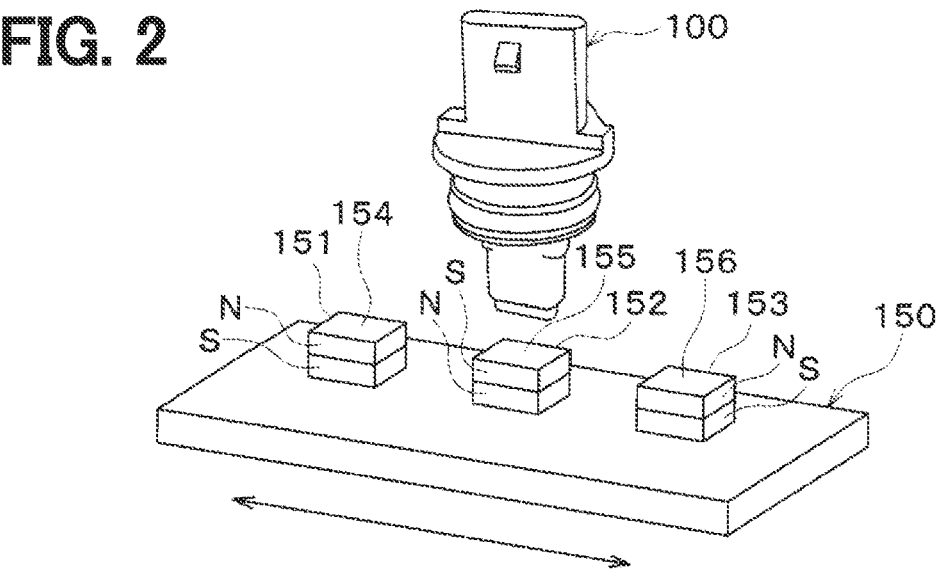
FIG. 2 is a diagram showing a case where a detection object moves along a straight line or moves back and forth.
Figure 3:
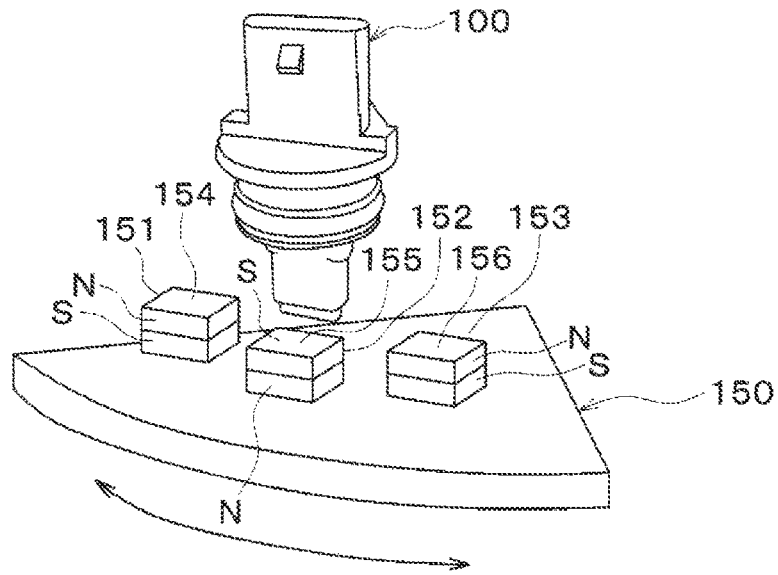
FIG. 3 is a diagram showing a case where the detection object rotates infinitely or back and forth.

As shown in FIG. 2, a detection object 150 may move along a straight line or move back and forth in the stroke direction. As shown in FIG. 3, the detection object 150 may also rotate or rotationally move along the stroke direction. The detection object 150 may rotate within a specific angle along the stroke direction.

The detection object 150 includes a plurality of magnets 151 to 153. Each of the magnets 151 to 153 is spaced apart along the stroke direction. Each of the magnets 151 to 153 is arranged such that adjacent magnetic pole surfaces 154 to 156 have opposite polarity.

Figure 4:
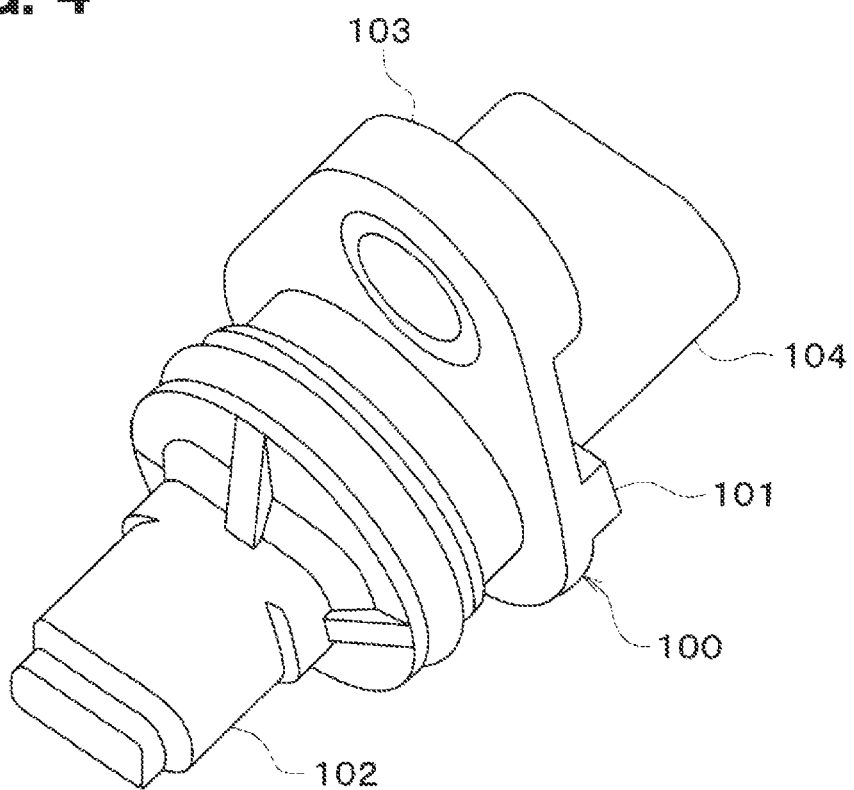
FIG. 4 is an external view of the linear position sensor according to the first embodiment.

As shown in FIG. 4, the sensor 100 includes a case 101 formed by molding a resin material such as PPS (Polyphenylenesulfide) or the like. The case 101 has a tip portion 102 on a side of the detection object 150, a flange portion 103 fixed to a surrounding mechanism, and a connector portion 104 to which a harness is connected. A sensing portion is provided inside the tip portion 102.

Further, the sensor 100 is fixed to the surrounding mechanism via the flange portion 103 so that the tip portion 102 has a predetermined gap with respect to each of the magnetic pole surfaces 154 to 156 of the detection object 150. Accordingly, the detection object 150 moves relative to the sensor 100.

Note that the position of the detection object 150 may be fixed and the sensor 100 may move along the stroke direction. The stroke direction is a direction of relative movement between the detection object 150 and the sensor 100. Therefore, the stroke range is a relative movement range between the detection object 150 and the sensor 100.

Figure 5:
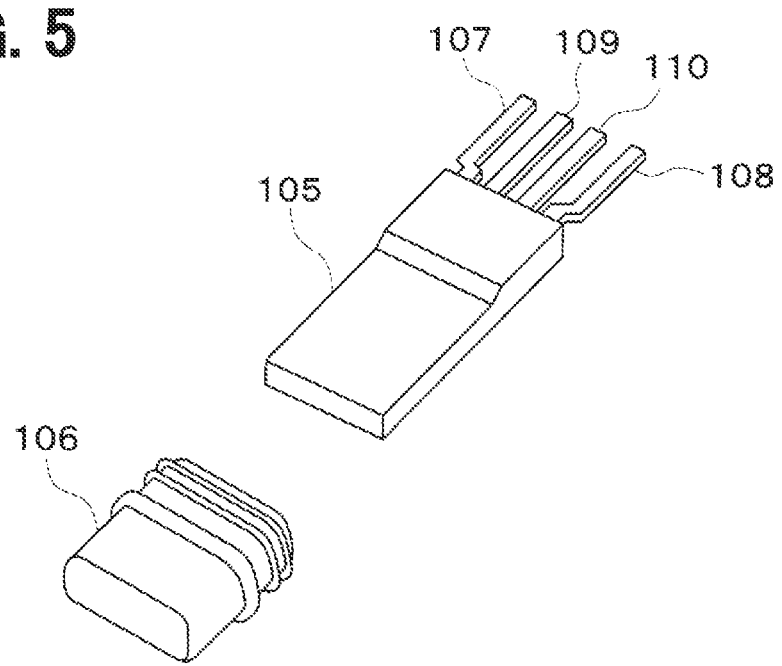
FIG. 5 is an exploded perspective view of parts constituting a magnetic detection system using a magnetoresistive element.

The sensor 100 may employ a magnetic detection form using a magnetoresistive element or a magnetic detection form using a Hall element. In case of the magnetic detection form using the magnetoresistive element, the sensor 100 includes a molded IC portion 105 and a cap portion 106, as shown in FIG. 5. The molded IC portion 105 is inserted into the cap portion 106. These are housed in the tip portion 102 of the case 101.

The molded IC portion 105 and the cap portion 106 are integrated with each other. A main portion of the molded IC portion 105 is positioned in a hollow portion of the cap portion 106. The cap portion 106 fixes the position of the molded IC portion 105 inside the case 101.

The molded IC portion 105 includes a lead frame, a processing circuit chip, a sensor chip, and a mold resin portion (not shown). The lead frame has a plurality of leads 107 to 110. A plurality of leads 107 to 110 correspond to a power source terminal 107 to which a power source voltage is applied, a ground terminal 108 to which a ground voltage is applied, a first output terminal 109 and a second output terminal 110 for outputting signals. In other words, there are four leads 107 to 110 for the power source, the ground, and the signal. A terminal is connected to a tip of each of the leads 107 to 110. A terminal is located in the connector portion 104 of the case 101. A terminal is also connected to a harness.

The processing circuit chip and the sensor chip are mounted on the lead frame with an adhesive or the like. The processing circuit chip comprises circuitry for processing signals of the sensor chip. The sensor chip includes a magnetoresistive element whose resistance value changes when it is affected by a magnetic field from the outside. The magnetoresistive element is, for example, AMR, GMR, or TMR.

The mold resin portion seals a part of the lead frame, the processing circuit chip, and the sensor chip so that the tip portions of the leads 107 to 110 are exposed. The mold resin portion is formed into a shape to be fixed to the hollow portion of the cap portion 106.

When a magnetic detection form using Hall elements is adopted, the molded IC portion 105 has a lead frame, an IC chip, and a mold resin portion. The lead frame includes an island portion on which an IC chip is mounted. The island portion is arranged such that a plane portion is in parallel with the stroke direction of the detection object 150. The IC chip has a plurality of Hall elements and a signal processing circuit section. That is, the magnetic detection system using a Hall element employs a one-chip configuration. A plurality of Hall elements may be composed of a plurality of chips. The type of chip configuration for the elements and the circuits may be selected as appropriate.

Figure 6:
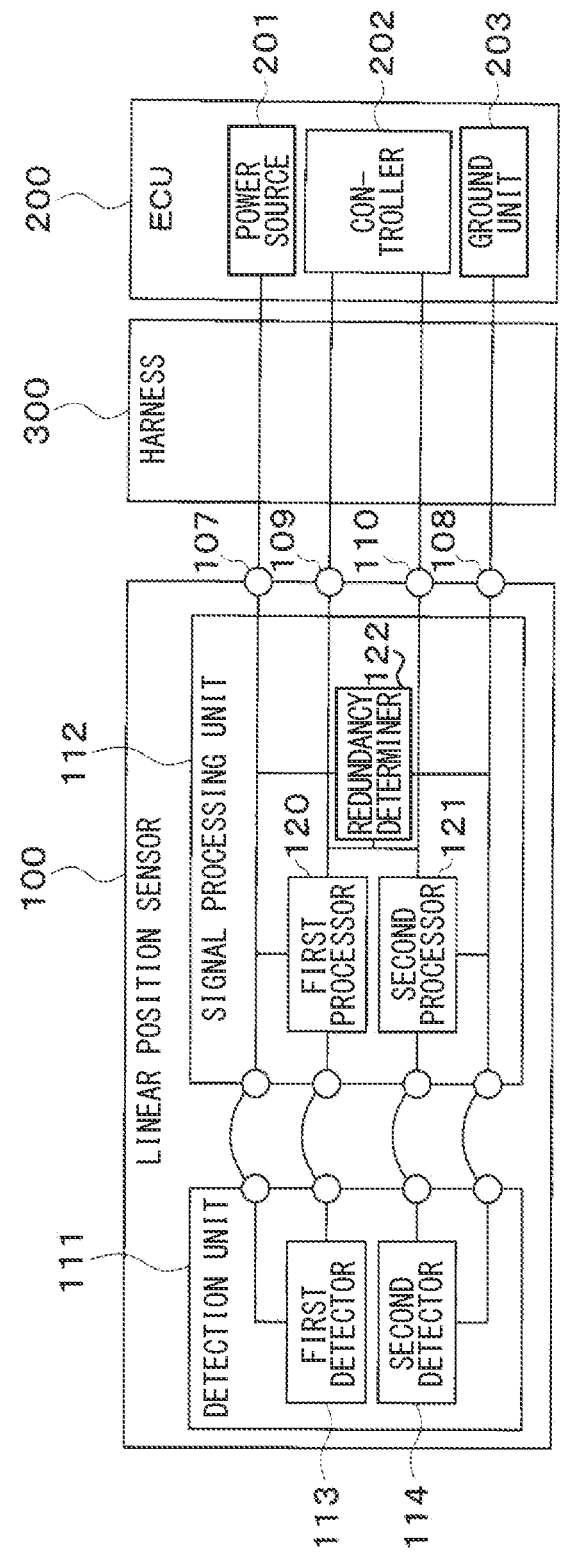
FIG. 6 is a diagram showing a circuit configuration of the linear position sensor.

Next, the circuit configuration formed in the sensor chip and the processing circuit chip or the IC chip is described. As shown in FIG. 6, the sensor 100 and the ECU 200 are electrically connected via a harness 300. As described above, the molded IC portion 105 has four leads 107 to 110, so the harness 300 is composed of four wires.

The ECU 200 is an electronic control device that includes a power source 201, a controller 202 and a ground unit 203. The power source 201 is a circuit that applies a power source voltage to the sensor 100. The controller 202 is a circuit that performs a predetermined control according a position signal input from the sensor 100. Note that the controller 202 may be configured as a circuit corresponding to each of the output terminals 109 and 110. A ground unit 203 is a circuit unit for setting the ground voltage of the sensor 100.

The sensor 100 includes a detector section 111 and a signal processor section 112. The detector section 111 includes a sensor chip. The signal processor section 112 is provided in the processing circuit chip. The detector section 111 and the signal processor section 112 operate based on the power source voltage applied from the ECU 200 and the ground voltage.

The detector section 111 is arranged with a gap in a gap direction with respect to each of the magnetic pole surfaces 154 to 156 of each of the magnets 151 to 153. The detector section 111 has a first detector 113 and a second detector 114. The first detector 113 is configured to output a first detection signal corresponding to the position of the detection object 150. The second detector 114 is configured to output a second detection signal corresponding to the position of the detection object 150. Each of the detectors 113 and 114 has the same configuration and outputs the same detection signal.

Figure 7:
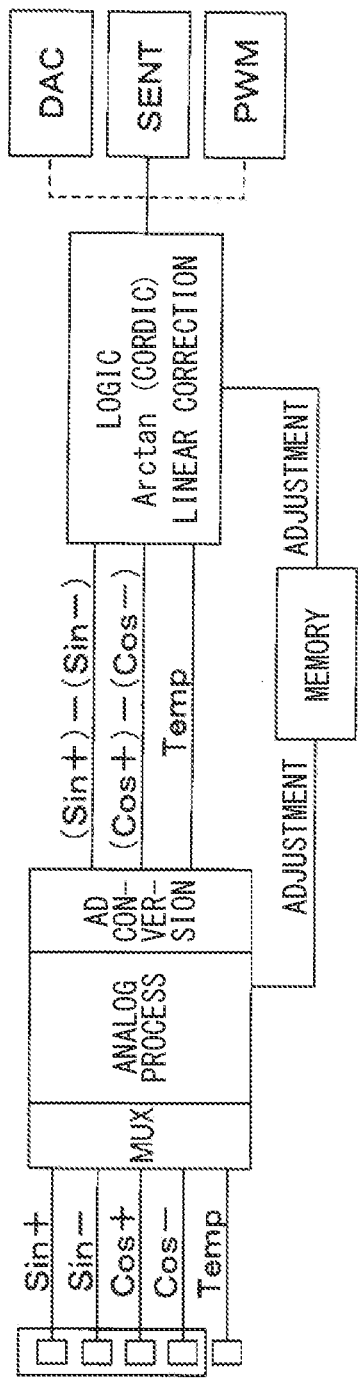
FIG. 7 is a diagram showing contents of signal processing of the circuit configuration shown in FIG. 6.

As shown in FIG. 7, each of the detectors 113, 114 has four magnetic detection elements and a temperature detection element. Note that FIG. 7 shows one of the detectors 113 and 114. In the present embodiment, each of the magnetic detection element changes its resistance value as the detection object 150 moves.

Each of the magnetic detection elements acquires, as a voltage value, a change in a resistance value when the magnetoresistive element is affected by a magnetic field. Each of the detectors 113 and 114 generates a plurality of detection signals with different phases from each of the voltage values. The plurality of different detection signals are a sine signal (sin θ) representing a sine function and a cosine signal (cos θ) representing a cosine function.

A magnetoresistive element for acquiring a sine signal (sin θ) is formed along the gap direction. A magnetoresistive element for acquiring a cosine signal (cos θ) is formed along the stroke direction. That is, the device formation directions are different by 90 degrees.

One of the magnetic detection elements outputs a voltage signal of Sin+. Similarly, the other three magnetic detection elements output Sin−, Cos+, and Cos− voltage signals. The Sin+ and Sin− voltage signals are sinusoidal and opposite in phase. The Cos+ and Cos− voltage signals are cosine signals and opposite in phase. The temperature detection element outputs a temperature signal of Temp.

The voltage signals of Sin+, Sin−, Cos+, Cos− and the temperature signal of Temp are sequentially switched by a multiplexer (MUX) and subjected to analog processing and AD conversion. Here, a difference between the voltage signal of Sin+ and the voltage signal of Sin− is calculated. As a result, a noise contained in each of the voltage signals is removed because the voltage signal of Sin+ and the voltage signal of Sin− are in opposite phase, and a sine signal (sin θ) having twice the amplitude is acquired. Similarly, a cosine signal (cos θ) is acquired by calculating a difference between the Cos+ voltage signal and the Cos− voltage signal.

Specifically, when the detection object 150 moves in the stroke direction, a magnetic vector of each of the magnetic detection elements changes according to the change in the magnetic field received from each of the magnets 151 to 153. That is, the magnetic vector received by the sensor chip rotates. As a result, the detectors 113 and 114 acquire a sine signal and a cosine signal as the detection signals having the phase corresponding to the positions of the magnets 151 to 153 based on changes in the magnetic fields received from the magnets 151 to 153 as the magnets 151 to 153 move relative to the detection object 150 in the stroke direction. Each of the detectors 113 and 114 outputs a detection signal to the signal processor section 112.

The signal processor section 112 in FIG. 6 is a circuit that processes the detection signal input from the detector section 111. The signal processor section 112 acquires the detection signal from the detector section 111, and acquires a position signal indicating the position of the detection object 150 based on the detection signal. The signal processor section 112 includes a first processor 120, a second processor 121 and a redundancy determiner 122.

Here, the first detector 113 and the first processor 120 constitute a first system. In addition, the second detector 114 and the second processor 121 constitute a second system. In other words, the detectors 113 and 114 and the processors 120 and 121 form a dual system.

The first processor 120 receives the first detection signal from the first detector 113, and acquires the position of the detection object 150 based on the first detection signal. The second processor 121 receives the second detection signal from the second detector 114, and acquires the position of the detection object 150 based on the second detection signal.

Specifically, each of the processors 120 and 121 calculates (signal value of cosine signal)/(signal value of sine signal). As a result, an arctangent signal that represents an arctangent function and increases at a constant rate of increase in signal value according to the position of the detection object 150 is acquired. The arctangent signal is a signal corresponding to the relative stroke amount between the detection object 150 and the detector section 111. Each of the processors 120 and 121 acquires the arctangent signal as a position signal.

Figure 8:
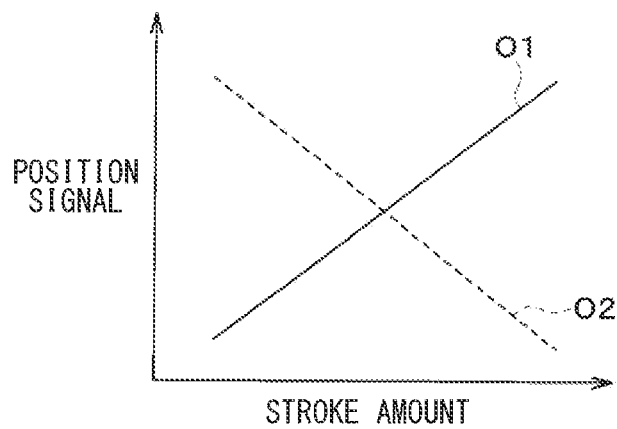
FIG. 8 is a diagram showing a position signal with respect to a stroke amount of the detection object.

As shown in FIG. 8, the first processor 120 outputs the arctangent signal to the ECU 200 as a first position signal (O1). The second processor 121 outputs, to the ECU 200, a second position signal (O2) acquired by inverting the arctangent signal. Therefore, when there is no abnormality in the detector section 111 or the signal processor section 112, the sum of the first position signal from the first processor 120 and the second position signal from the second processor 121 gives a constant value.

The redundancy determiner 122 in FIG. 6 is a circuit that determines whether the position of the detection object 150 acquired by the first processor 120 and the position of the detection object 150 acquired by the second processor 121 match. When the signal processing results of the two systems match, the signal processor section 112 outputs each of the position signals as they are. If the signal processing results of the two systems do not match, there is a possibility that an abnormality has occurred in either one or both of the systems. In such case, the signal processor section 112 outputs an abnormality signal indicating an abnormality to the ECU 200.

The signal processing may be summarized, for example, as shown in FIG. 7. Analog processing is processing that generates multiple detection signals. Note that the detector section 111 may have a function of detecting temperature. Information on the temperature is used for a temperature correction Temp.

The analog-processed analog signal is AD-converted into a digital signal, and is further processed to generate an arctangent signal. The adjustment values stored in a memory of the sensor 100 are appropriately used in the analog processing and arithmetic processing. The position signal acquired by the arithmetic processing is output to the ECU 200 in accordance with an output format such as DAC, SENT, PWM or the like.

Note that analog processing and arithmetic processing are performed by the signal processor section 112. Therefore, an A/D converter and a memory for performing the AD conversion are provided in the signal processor section 112. The above is the configuration of the sensor 100 according to the present embodiment.

Figure 9:
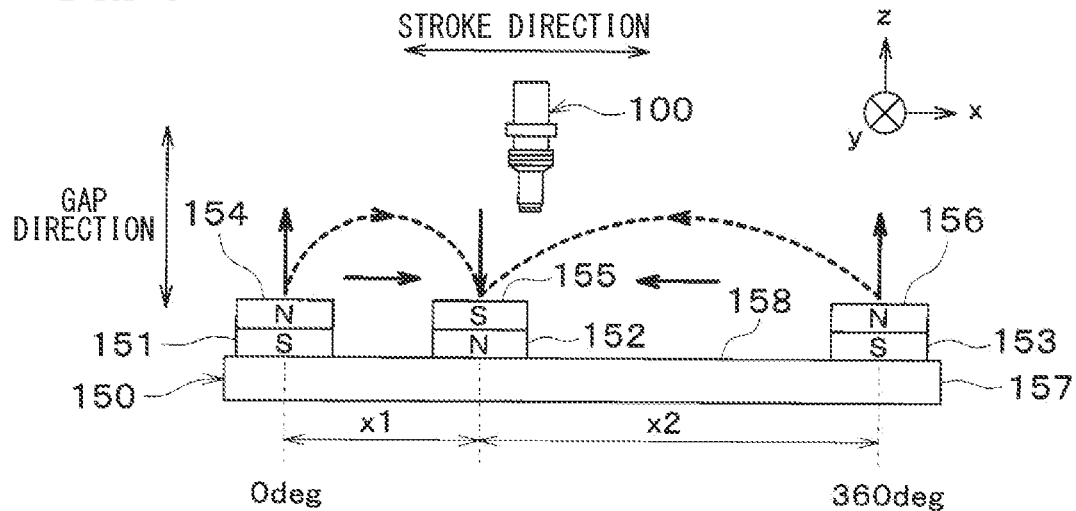
FIG. 9 is a diagram showing a configuration of the detection object according to the first embodiment.

Next, a configuration of the detection object 150 according to the present embodiment is described. As shown in FIG. 9, the detection object 150 includes a first magnet 151, a second magnet 152, a third magnet 153 and a yoke 157. The yoke 157 is a magnetic plate having one surface 158. The yoke 157 is fixed to the movable component of the drive unit 12.

The first magnet 151 has a first magnetic pole surface 154 of an N pole. The second magnet 152 has a second magnetic pole surface 155 of an S pole. The third magnet 153 has a third magnetic pole surface 156 of an N pole. Each of the magnets 151 to 153 is a sintered magnet. The material of the magnets 151 to 153 is, for example, a rare earth element such as ferrite, neodymium, samarium cobalt, and the like. Each of the magnets 151 to 153 has the same size.

Each of the magnets 151 to 153 is arranged on one surface 158 of the yoke 157 with each of the magnetic pole surfaces 154 to 156 facing the sensor 100. The second magnet 152 is arranged at a position between the first magnet 151 and the third magnet 153. The width of the one surface 158 of the yoke 157 in the y-direction is the same as that of each of the magnets 151 to 153. Note that the y-direction is a direction perpendicular to the stroke direction among directions of the one surface 158 of the yoke 157.

Here, a position between the first magnet 151 and the third magnet 153 is defined as 0 deg to 360 deg. Specifically, in the stroke direction, the position from a width center of the first magnet 151 to a width center of the third magnet 153 is set to 0 deg to 360 deg. "360 deg" is an electrical angle. That is, an amount of the stroke of the detection object 150 is represented by an electrical angle. Therefore, the electrical angle is converted into a length.

Further, regarding the magnets 151 to 153, a first interval x1 between the first magnet 151 and the second magnet 152 and a second interval x2 between the second magnet 152 and the third magnet 153 are different. That is, the magnets 151 to 153 are arranged at non-equidistant intervals. In the present embodiment, the first interval x1 is shorter than the second interval x2.

The inventors have investigated an error contained in an ideal position signal in the above configuration. The ideal position signal is a signal whose signal value increases at a constant rate of increase according to the stroke amount. The error is an amount of deviation from the ideal signal value proportional to the stroke amount. The error is expressed as a ratio of the stroke amount of the detection object 150 to a full scale stroke. The error of the above configuration is shown in FIG. 10.

Figure 10:
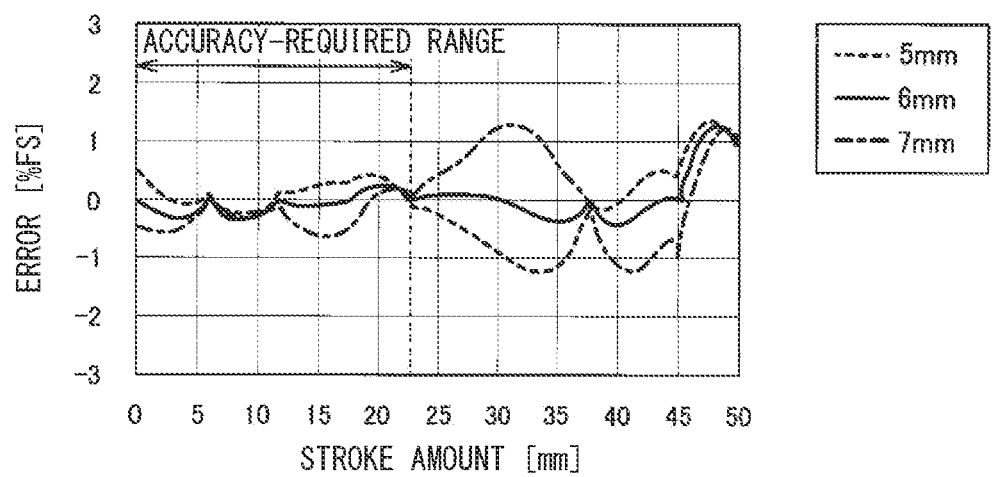
FIG. 10 is a diagram showing an error with respect to the stroke amount of the detection object shown in FIG. 9.

As shown in FIG. 10, the error of the position signal corresponding to the first interval x1 is smaller than the error of the position signal corresponding to the second interval x2. That is, the stroke range corresponding to the first interval x1 has higher detection accuracy than the stroke range corresponding to the second interval x2. The same results are acquired when the gap between each of the magnetic pole surfaces 154 to 156 and the sensor 100 in the gap direction is changed.

This is because the magnetic field formed in the first interval x1 and the magnetic field formed in the second interval x2 are unbalanced. Assuming that the accuracy-required range in which a certain detection accuracy is required is the stroke range corresponding to the first interval x1, it can be said that the detection accuracy of the stroke range corresponding to the first interval x1 has improved in the entire stroke range. Therefore, it is possible to selectively improve the detection accuracy of the accuracy-required range within the entire stroke range.

Figure 11:
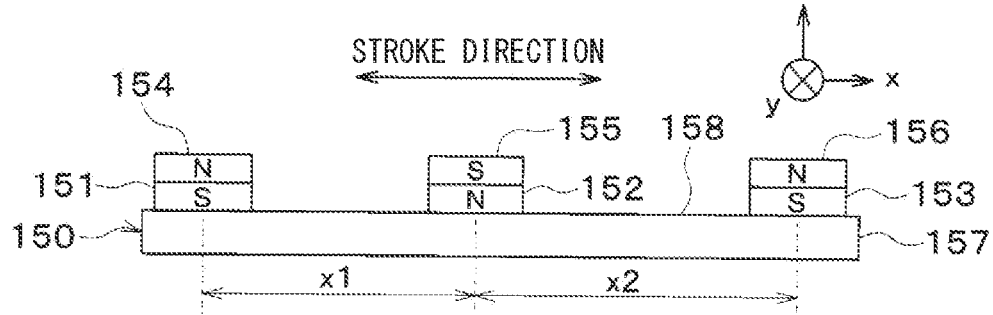
FIG. 11 is a diagram showing, as a comparative example, a configuration of the detection object different from that in FIG. 9.
Figure 12:
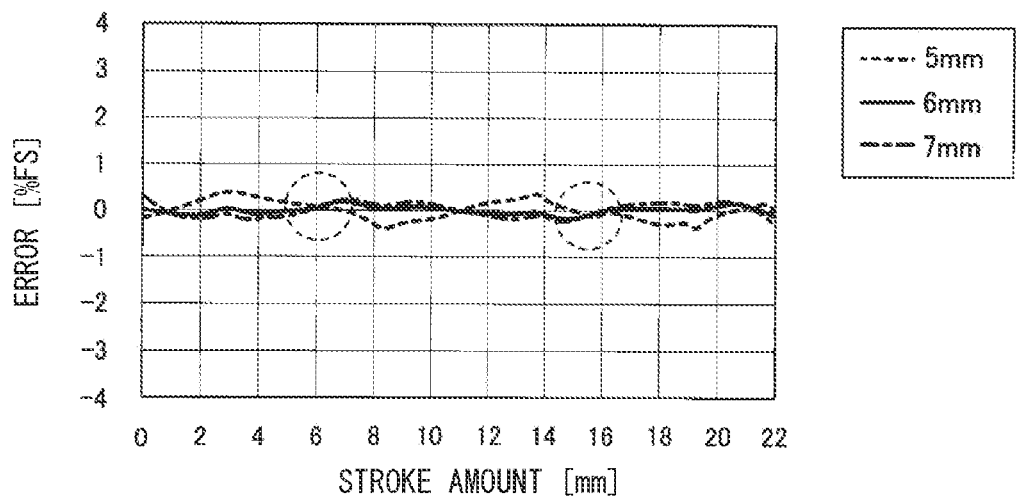
FIG. 12 is a diagram showing an error with respect to the stroke amount of the detection object shown in FIG. 11.

As a comparative example, there may be a case in which, as shown in FIG. 11, the second interval x2 is slightly larger than the first interval x1. In such case, as shown in FIG. 12, the errors in the entire stroke range are almost 0 at the two positions regardless of the gap difference.

Figure 13:
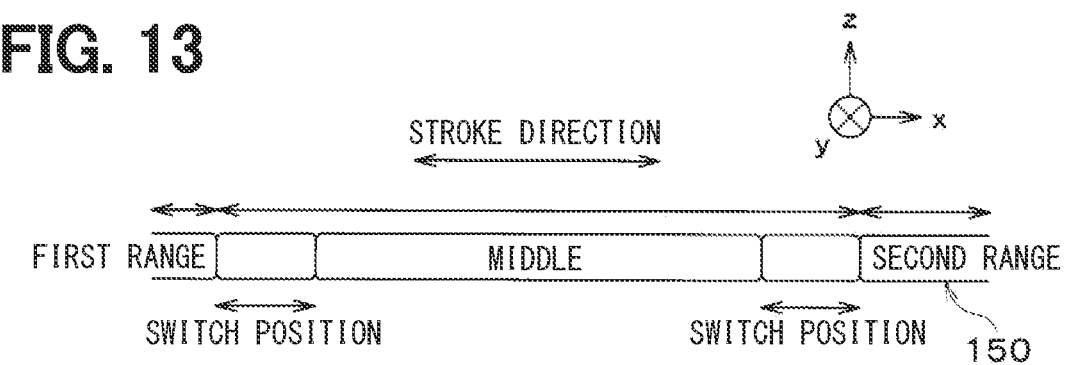
FIG. 13 is a diagram showing, as a comparative example, an example in which a certain accuracy is required at a switch position between two specific ranges.

Assuming that the accuracy-required positions requiring a certain detection accuracy are, for example, stroke amounts of around 6 mm and around 16 mm, it can be said that the detection accuracy at two positions of the detection object 150 has improved within the entire stroke range. Such an improvement is utilizable, as shown in FIG. 13, in a case in which a certain detection accuracy is required at switch positions, i.e., a boundary position between a first range and a middle position (i.e., between two specific ranges), and a boundary position between a second range and the middle position (i.e., between two specific ranges).

As described above, in the present embodiment, the magnets 151 to 153 are arranged at non-equidistant intervals. In such manner, the magnetic fields received from the magnets 151 to 153 by the detector section 111 of the sensor 100 can be adjusted in an unbalanced manner. Therefore, it is possible to selectively improve the detection accuracy in the accuracy-required range or at the accuracy-required position within the entire stroke range.

Second Embodiment

Figure 14:
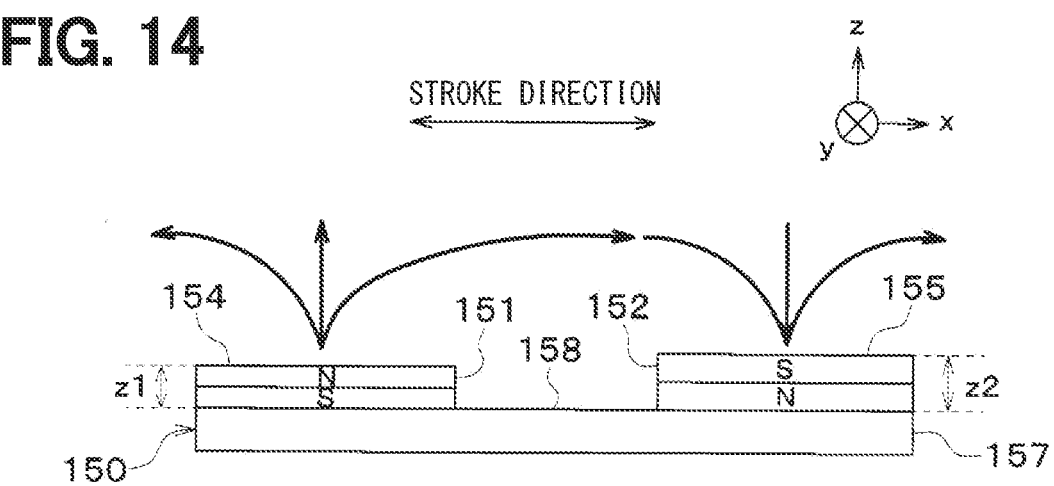
FIG. 14 is a diagram showing a configuration of the detection object according to a second embodiment.

In the present embodiment, portions different from those of the first embodiment are mainly described. As shown in FIG. 14, the detection object 150 includes the first magnet 151, the second magnet 152 and the yoke 157. The width of the yoke 157 in the stroke direction is measured as the one from an end of the first magnet 151 to an end of the second magnet 152.

In the gap direction, using the one surface 158 of the yoke 157 as a reference, a first height z1 of the first magnetic pole surface 154 of the first magnet 151 and a second height z2 of the second magnetic pole surface 155 of the second magnet 152 are different. In the present embodiment, the first height z1 is lower than the second height z2. The first height z1 is, for example, 2 mm. The second height z2 is, for example, 3 mm.

Figure 15:
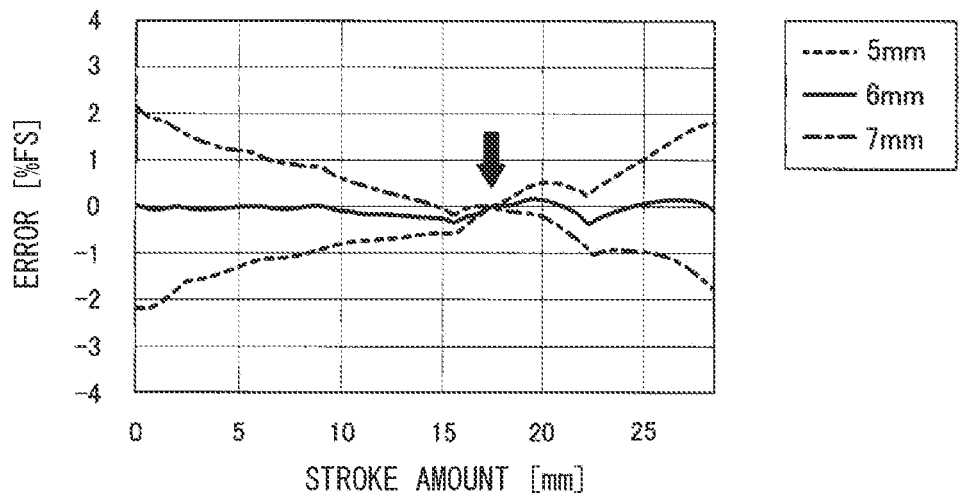
FIG. 15 is a diagram showing an error with respect to the stroke amount of the detection object shown in FIG. 14.

The inventors have investigated an error of the position signal as have done in the first embodiment. The results are shown in FIG. 15. As indicated by the arrow in FIG. 15, the error became 0 at a stroke amount of 18 mm regardless of the gap difference.

Figure 16:
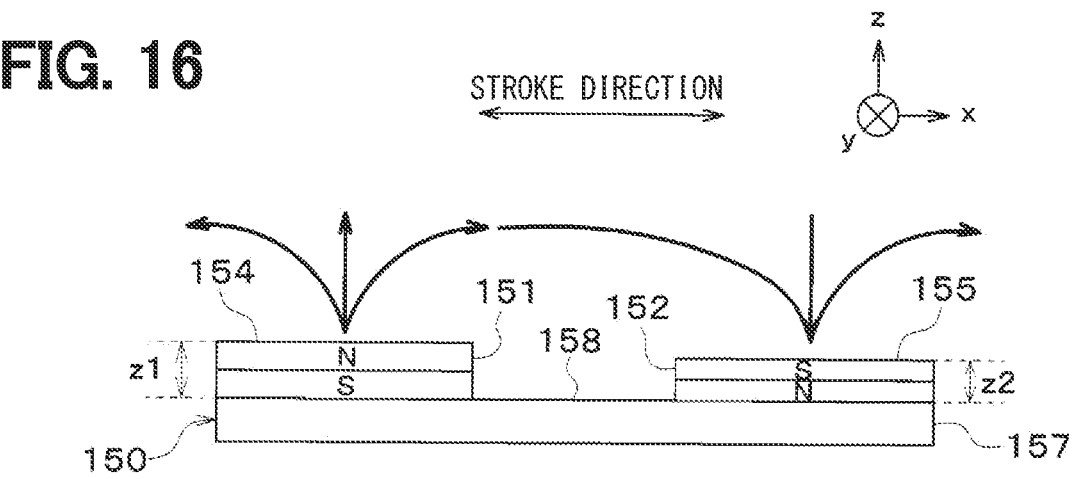
FIG. 16 is a diagram showing, as a comparative example, a configuration of the detection object different from that in FIG. 14.
Figure 17:
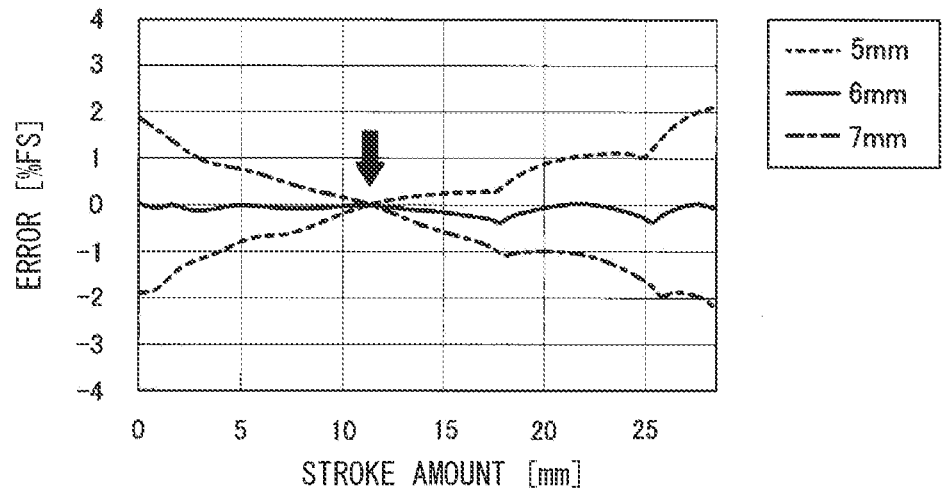
FIG. 17 is a diagram showing an error with respect to the stroke amount of the detection object shown in FIG. 16.

As a comparative example, the first height z1 of the first magnet 151 may be set to be higher than the second height z2 of the second magnet 152, as shown in FIG. 16. The first height z1 is, for example, 3 mm. The second height z2 is, for example, 2 mm. In such case, as indicated by the arrow in FIG. 17, the error became 0 at a stroke amount of 11 mm regardless of the gap difference.

Figure 18:
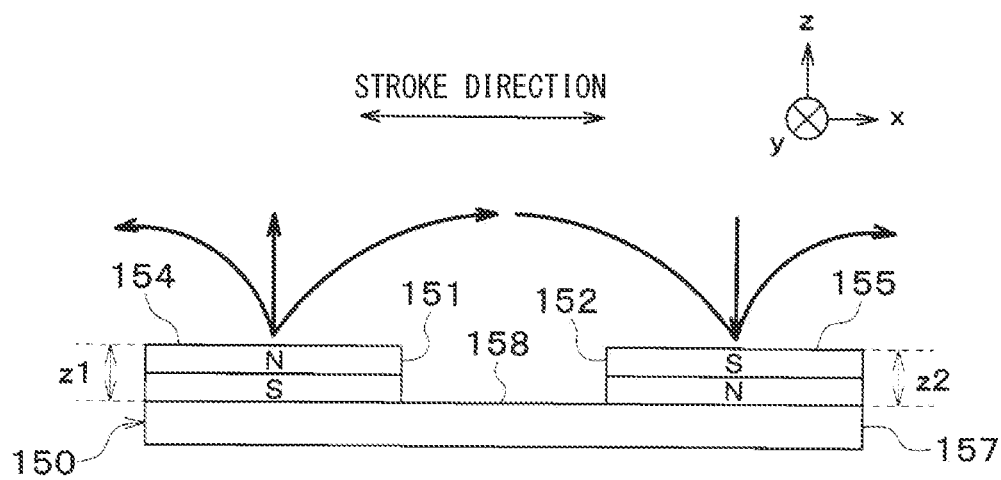
FIG. 18 is a diagram showing, as a comparative example, a case where heights of respective faces of magnetic poles are same.
Figure 19:
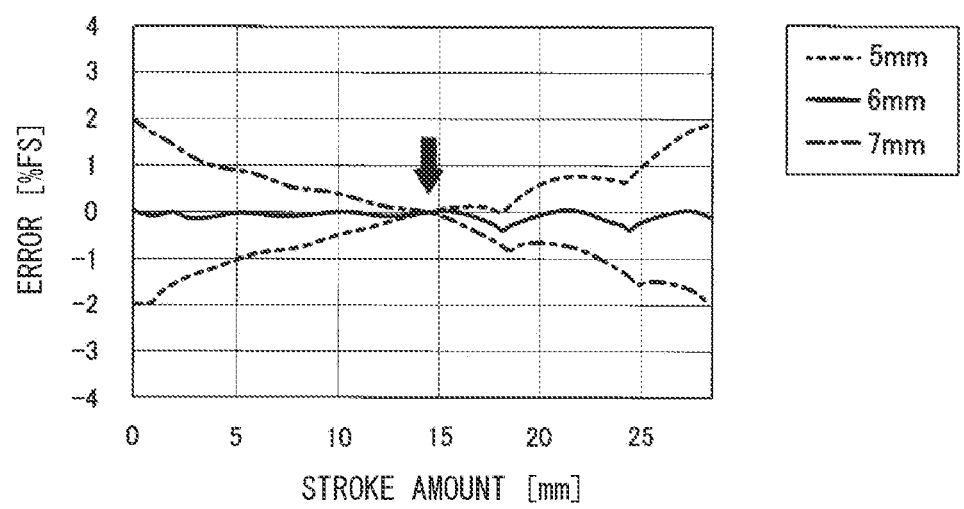
FIG. 19 is a diagram showing an error with respect to the stroke amount of the detection object shown in FIG. 18.

As another comparative example, as shown in FIG. 18, the height of the magnets 151, 152 may be the same. The height of the magnets 151, 152 is, for example, 3 mm. In such case, as indicated by the arrow in FIG. 19, the error became 0 at a stroke amount of 14 mm regardless of the gap difference.

From the above results, it can be seen that the positions with high detection accuracy can be adjusted by changing the heights of the magnets 151 and 152. This is because the magnetic field formed by the first magnet 151 and the magnetic field formed by the second magnet 152 are unbalanced due to the heights of the magnets 151 and 152 made different. That is, in other words, due to the difference in the heights of the magnets 151 and 152, the amounts of magnetic force "absorbed" and "discharged" by the magnets 151 and 152 become unbalanced.

As described above, by making the heights of the magnets 151 and 152 different, the detection accuracy of a specific position close to the higher one of the magnets 151 and 152 within the entire stroke range is improvable. Therefore, it is possible to selectively improve the detection accuracy of the accuracy-required position within the entire stroke range.

Figure 20:
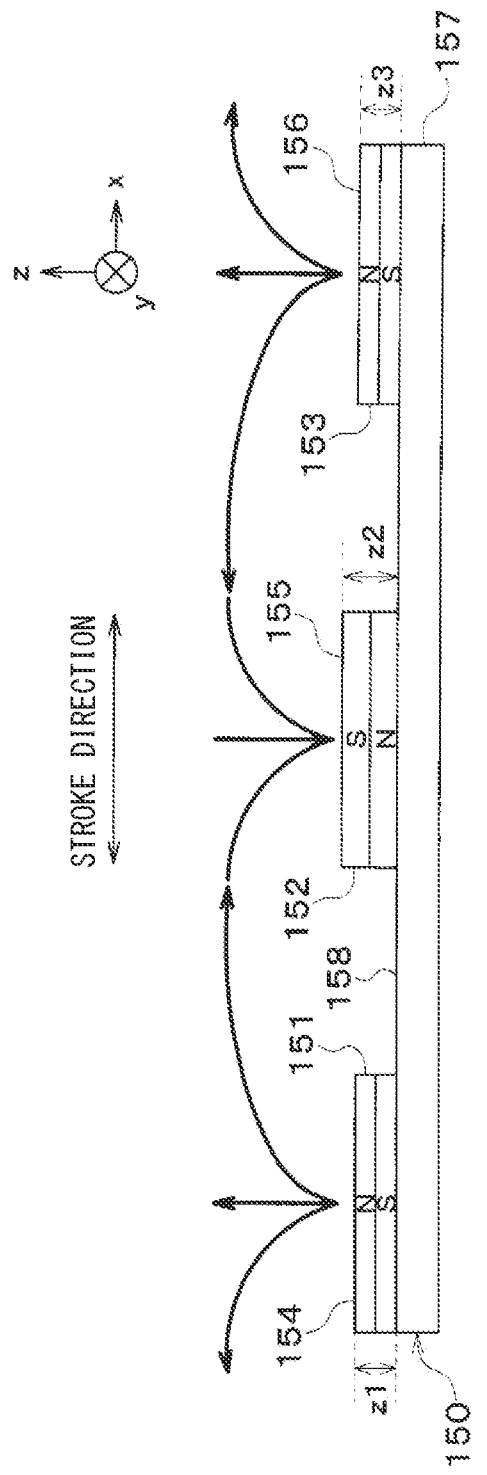
FIG. 20 is a diagram showing, as a modification, a case where there are three magnets.

Alternatively, as shown in FIG. 20, the detection object 150 may have the third magnet 153 with a third height z3. In such case, the height of at least one of the magnetic pole surfaces 154 to 156 of the magnets 151 to 153 is different from the other heights in the gap direction with the one surface 158 of the yoke 157 used as a reference. For example, the second height z2 of the second magnet 152 is higher than the height of the first magnet 151 and the height of the third magnet 153. Alternatively, the second height z2 of the second magnet 152 is lower than the height of the first magnet 151 and the height of the third magnet 153. The first height z1 and the third height z3 are the same. Note that the heights of the magnets 151 to 153 may all be respectively different.

Figure 21:
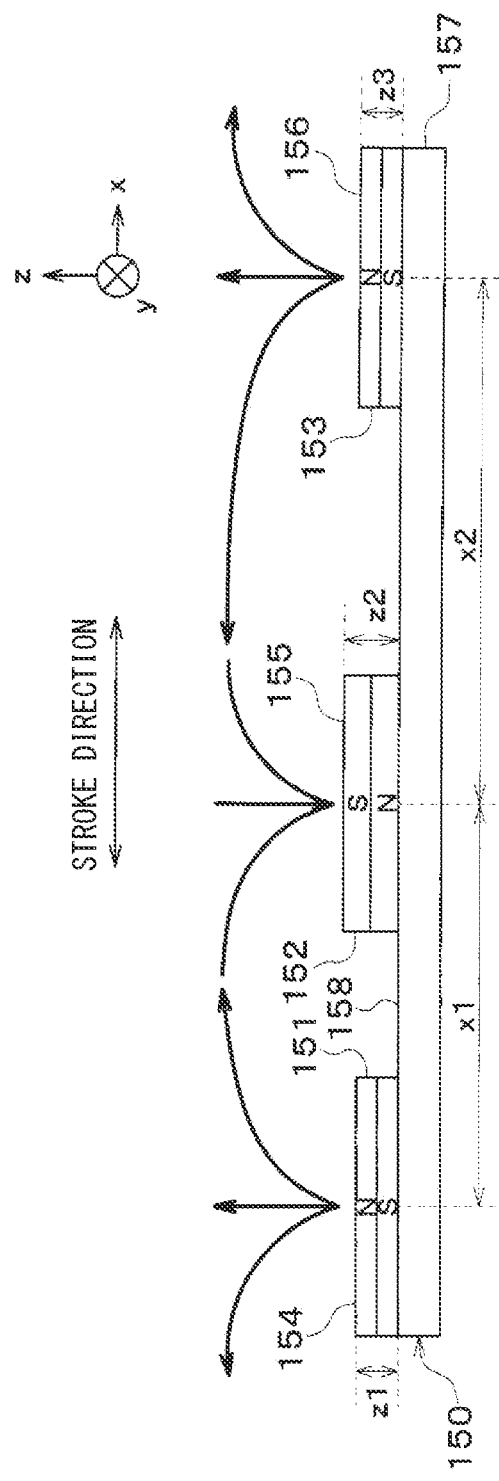
FIG. 21 is another diagram showing, as a modification, a case where there are three magnets.

Alternatively, as shown in FIG. 21, the three magnets 151 to 153 may have different heights and may be arranged at non-equidistant intervals. FIG. 21 shows a case where the second height z2 of the second magnet 152 is higher than the heights of the first magnet 151 and the third magnet 153. Of course, the second height z2 of the second magnet 152 may be lower than the heights of the first magnet 151 and the third magnet 153, or the heights of the magnets 151 to 153 may all be respectively different.

Third Embodiment

Figure 22:
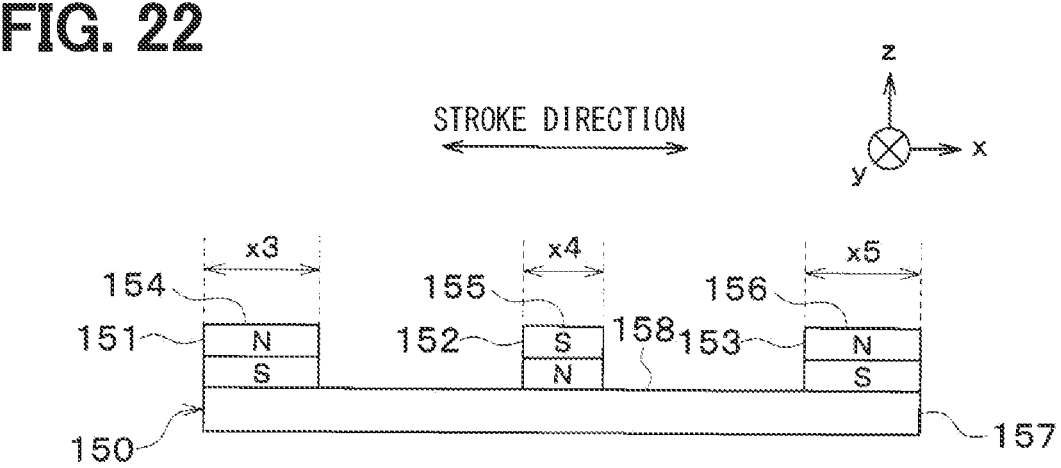
FIG. 22 is a diagram showing a configuration of the detection object according to a third embodiment.

In the present embodiment, different portions from the one in the first and second embodiments are mainly described. As shown in FIG. 22, the detection object 150 has the three magnets 151 to 153 and the yoke 157.

The magnets 151 to 153 are arranged at equal intervals. The distance from the width center of the first magnet 151 to the width center of the third magnet 153 in the stroke direction is, for example, 25 mm. The distance from an end of the first magnet 151 on a side of the second magnet 152 to an end of the third magnet 153 on a side of the second magnet 152 in the stroke direction is, for example, 20 mm.

In the stroke direction, at least one of a first width x3 of the first magnetic pole surface 154 of the first magnet 151, a second width x4 of the second magnetic pole surface 155 of the second magnet 152, and a third width x5 of the third magnetic pole surface 156 of the third magnet 153 is different from the other widths. In the present embodiment, the second width x4 is smaller than the first width x3 and the third width x5. The first width x3 and the third width x5 are the same. The second width x4 is, for example, 3 mm. The first width x3 and the third width x5 are, for example, 5 mm.

Figure 23:
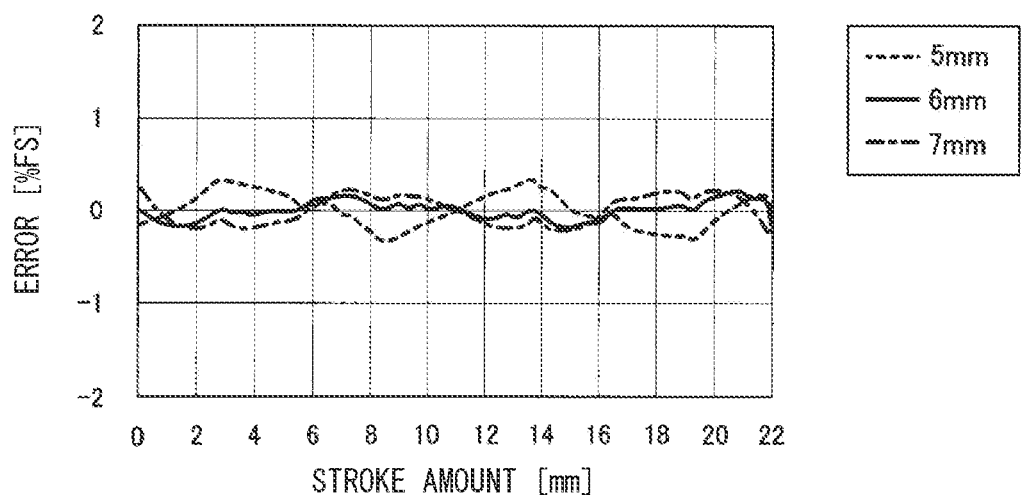
FIG. 23 is a diagram showing an error with respect to the stroke amount of the detection object shown in FIG. 22.

The inventors have investigated an error of the position signal as have done in the first embodiment. The results are shown in FIG. 23. As shown in FIG. 23, the error decreased throughout the stroke range and became zero at certain positions, regardless of the gap difference.

Figure 24:
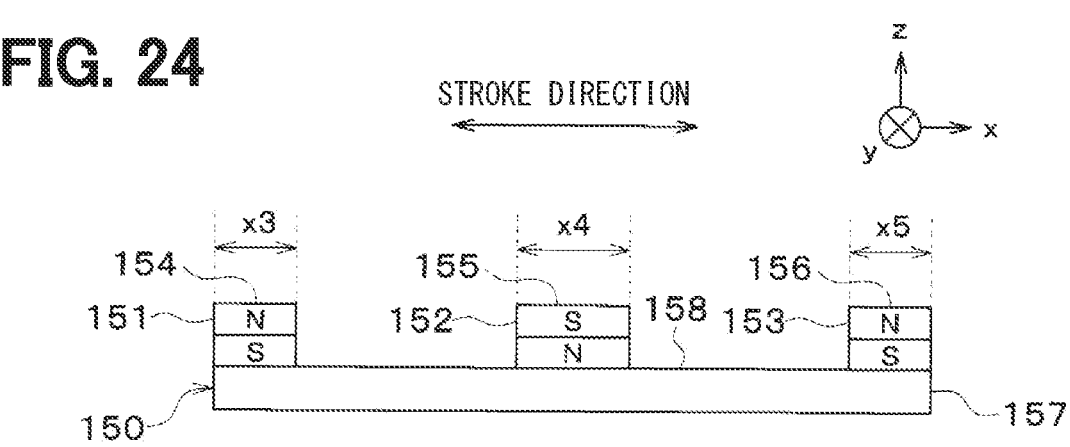
FIG. 24 is a diagram showing, as a comparative example, a configuration of the detection object different from that of FIG. 22.
Figure 25:
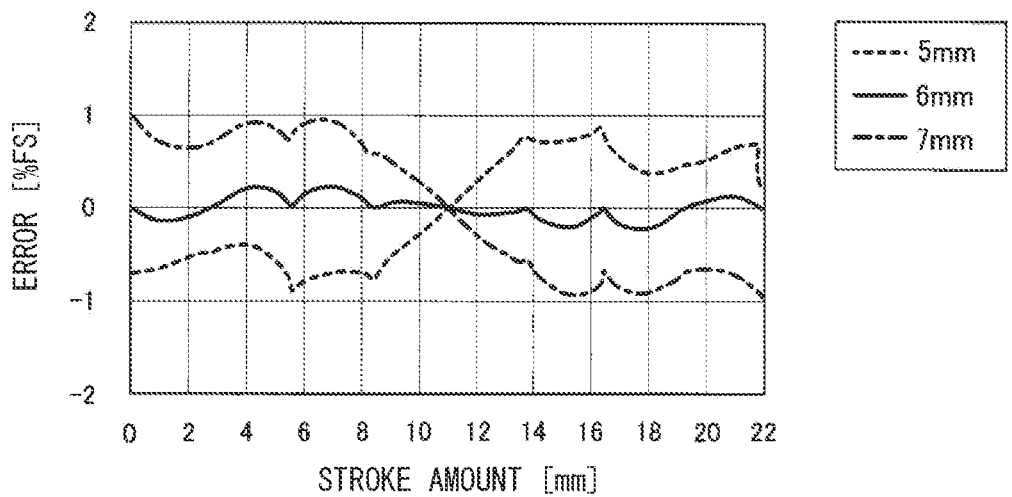
FIG. 25 is a diagram showing an error with respect to the stroke amount of the detection object shown in FIG. 24.

As a comparative example, as shown in FIG. 24, the second width x4 may be larger than the first width x3 and the third width x5. The second width x4 is, for example, 5 mm. The first width x3 and the third width x5 are, for example, 3 mm. In such case, as shown in FIG. 25, the error became zero at a specific position in the stroke amount range of 10 mm to 12 mm regardless of the gap difference. However, in the stroke amount range of 0 mm to 10 mm and 12 mm to 22 mm, the error is large when the gap is 5 mm and 7 mm.

Figure 26:
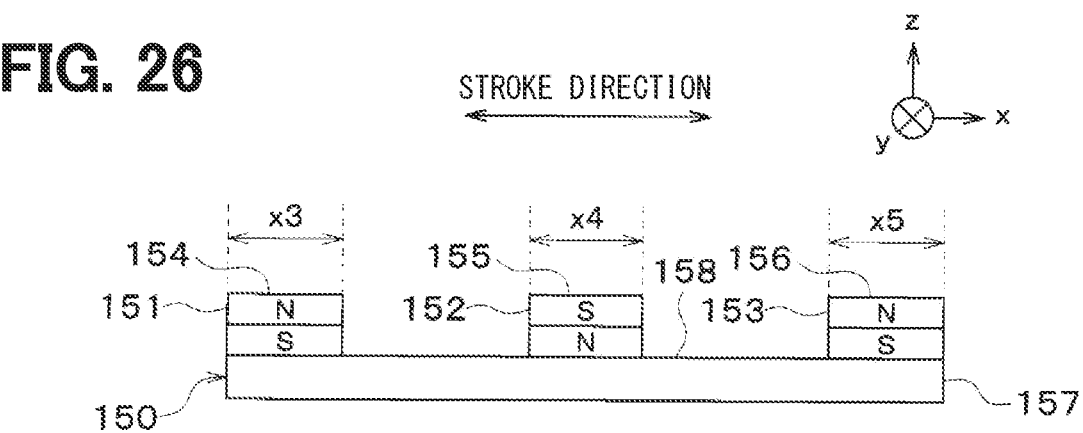
FIG. 26 is a diagram showing, as a comparative example, a case where widths of respective faces of the magnetic poles are the same.
Figure 27:
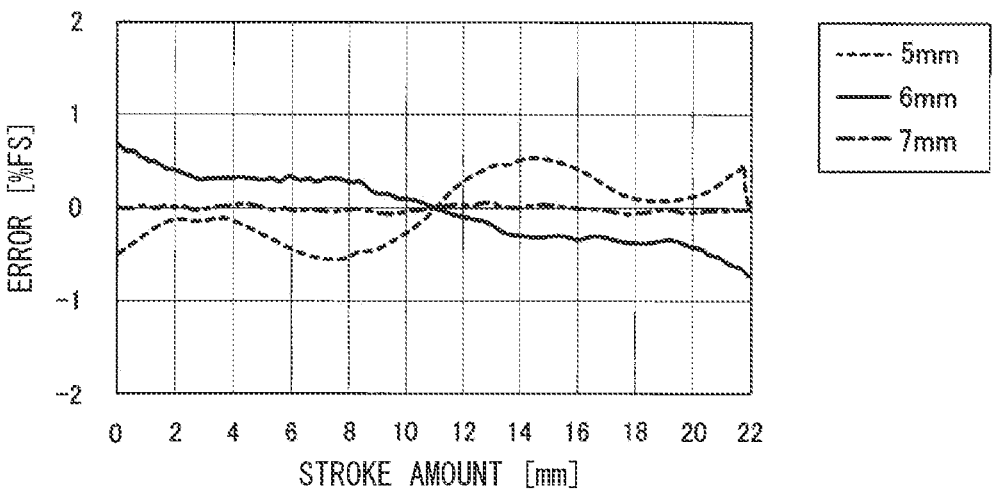
FIG. 27 is a diagram showing an error with respect to the stroke amount of the detection object shown in FIG. 26.

As another comparative example, as shown in FIG. 26, the width of the magnets 151 to 153 are all the same. The width of the magnets 151 to 153 is, for example, 3 mm. In such case, as shown in FIG. 27, the error is smaller throughout the entire stroke range than the one in the comparative example of FIG. 24.

According to the above results, when the second width x4 is larger than the first width x3 and the third width x5, the magnetic vector is strongly attracted to the second magnet 152, thereby making the error larger in a certain part of the stroke range. On the other hand, when the second width x4 is smaller than the first width x3 and the third width x5, the magnetic vector is less strongly attracted to the second magnet 152. As a result, the detection accuracy is improved not only in the stroke amount range of 10 mm to 12 mm, but also in the stroke amount ranges of 0 mm to 10 mm and 12 mm to 22 mm.

As described above, by making the widths of the magnets 151 to 153 different in the stroke direction, it is possible to selectively improve the detection accuracy of the accuracy-required range within the entire stroke range.

Figure 28:
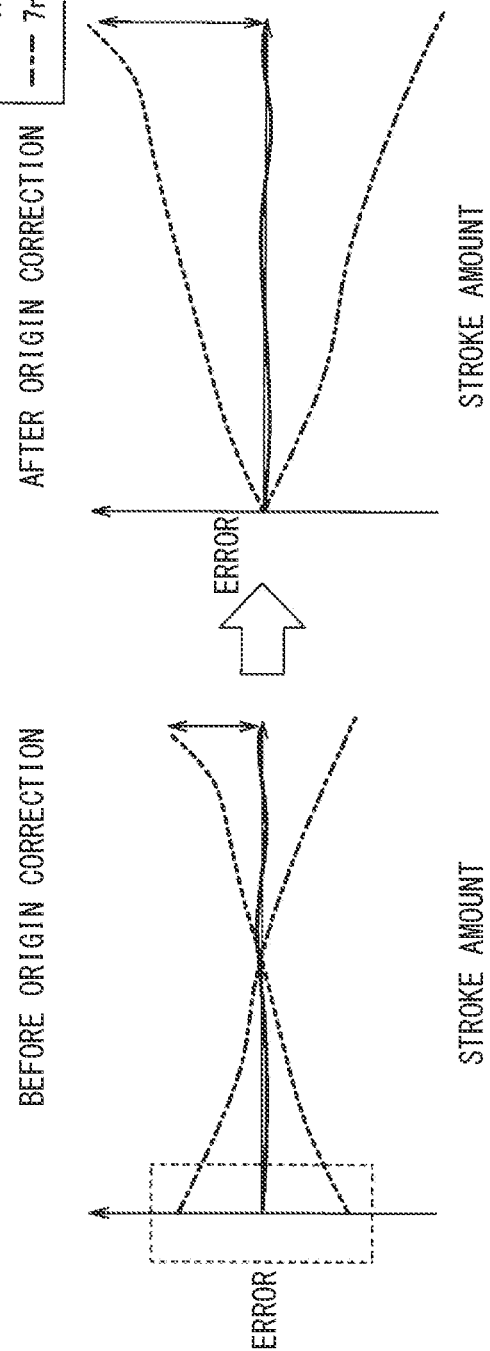
FIG. 28 is a diagram showing magnetic vectors of the detection object according to the third embodiment.

Further, as shown in FIG. 28, there is a position between the first magnet 151 and the second magnet 152 in the stroke direction where the magnetic vectors are aligned in the stroke direction regardless of the gap value. The same is applicable between the second magnet 152 and the third magnet 153 in the stroke direction.

Normally, the sensor 100 is mounted on the vehicle so that an origin and end points of the detection range are the positions where the magnetic vectors are aligned in the stroke direction regardless of the gap value, which may suffer from an assembly displacement of the sensor 100 and/or the detection object 150. Assembly displacement causes an error in the position signal at the origin of the stroke. Note that, in the stroke direction, the position where the magnetic vectors are aligned in the stroke direction regardless of the gap value corresponds to the position where the gap characteristic disappears.

Therefore, origin correction is performed for zeroing the error of the position signal at the origin of the stroke. Origin correction is performed after the sensor 100 is mounted. By performing the origin correction, a correction value is added to the position signal so that the error of the origin of the stroke becomes zero. The correction value is an offset value of the position signal. The offset value is stored in a memory of the ECU 200. The offset value may also be stored in the memory of the sensor 100.

For example, when a magnetic circuit is configured that does not consider an error, a large error occurs at the origin of the stroke before the origin correction, as shown in FIG. 28. Therefore, by performing the origin correction, the error of the origin of the stroke becomes 0. However, the larger the stroke amount is, the larger the error becomes. Therefore, it is difficult to expand the usable range of the electrical angle. When the usable range of the electrical angle is widened, the error becomes even larger.

Figure 29:
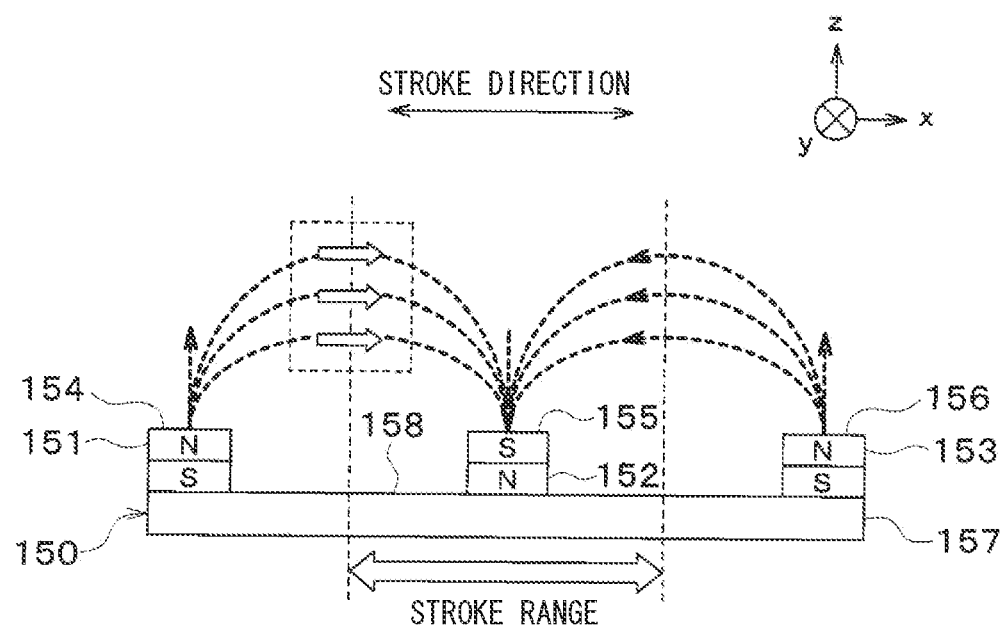
FIG. 29 is a diagram showing errors before and after origin correction in the detection object shown in FIG. 28.
Figure 30:
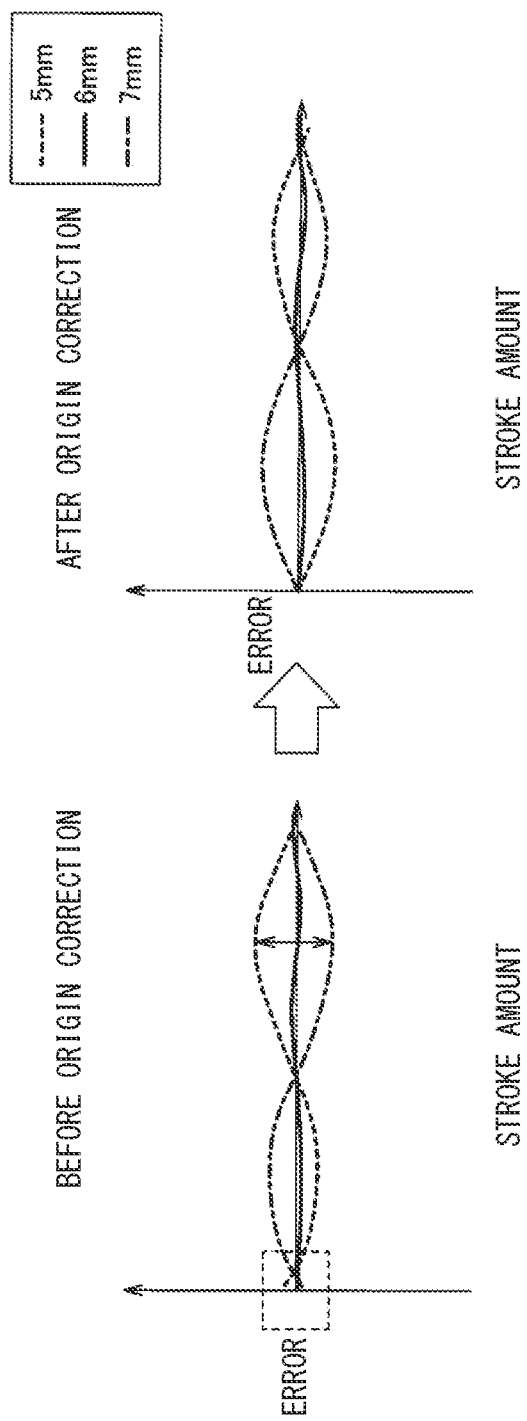
FIG. 30 is a diagram showing, as a comparative example, the magnetic vector in a case where widths of respective surfaces of the magnetic poles are the same.

On the other hand, as shown in FIG. 29, the widths of the magnets 151 to 153 in the stroke direction are configured to be all the same. The origin of the detection range is set to a position between the first magnet 151 and the second magnet 152, and the end point of the detection range is set to a position between the second magnet 152 and the third magnet 153. In such case, as shown in FIG. 30, before origin correction, an error occurs at the origin of the stroke, but it is smaller than the one shown in FIG. 28. Then, after the origin correction, the error becomes 0 at the origin of the stroke. The maximum error width is also smaller than the one before the origin correction. Accordingly, the similar effects of the first embodiment can be produced.

Figure 31:
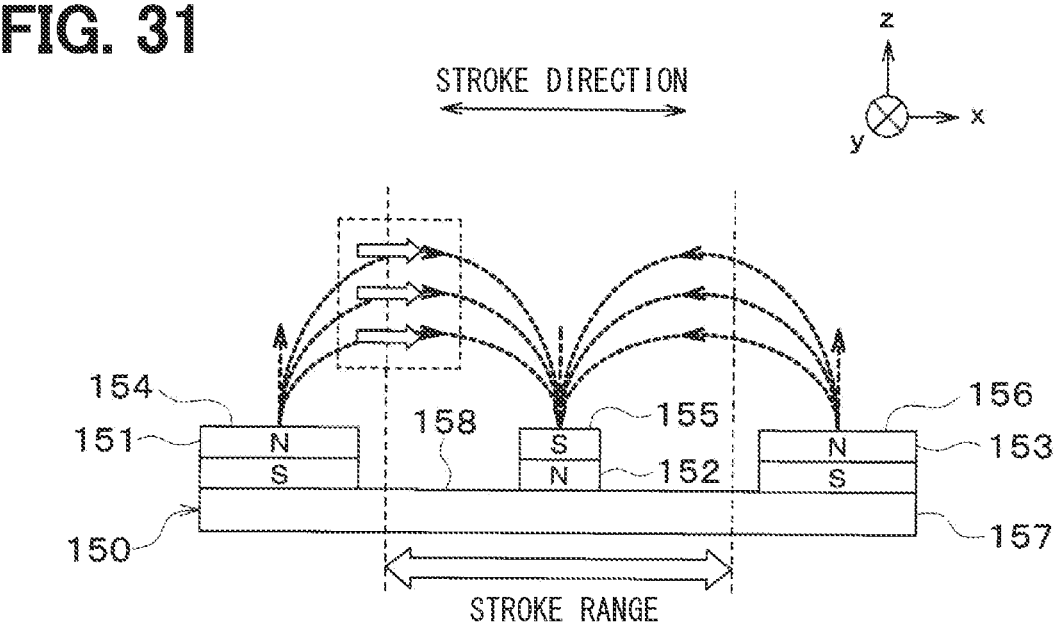
FIG. 31 is a diagram showing errors before and after origin correction in the comparative example shown in FIG. 30.

In addition, as shown in FIG. 31, the width of the magnets 151 and 153 on both sides in the stroke direction is made larger than the width of the second magnet 152. As a result, the magnetic force lines of the magnets 151 and 153 on both sides are relatively prevented from being drawn into the second magnet 152, so the position where the magnetic vectors are aligned in the stroke direction shifts toward the magnets 151 and 153 on both sides. Therefore, the origin of the detection range shifts closer to the first magnet 151 than the intermediate position between the first magnet 151 and the second magnet 152, and the end point of the detection range shifts closer to the third magnet 153 than the intermediate position between the second magnet 152 and the third magnet 153. In other words, since the usable range of the electrical angle is widened, the detection range can be widened. It should be noted that the origin correction can be performed in the same manner as described above even when the detection object 150 has two magnets 151 and 152.

Figure 32:
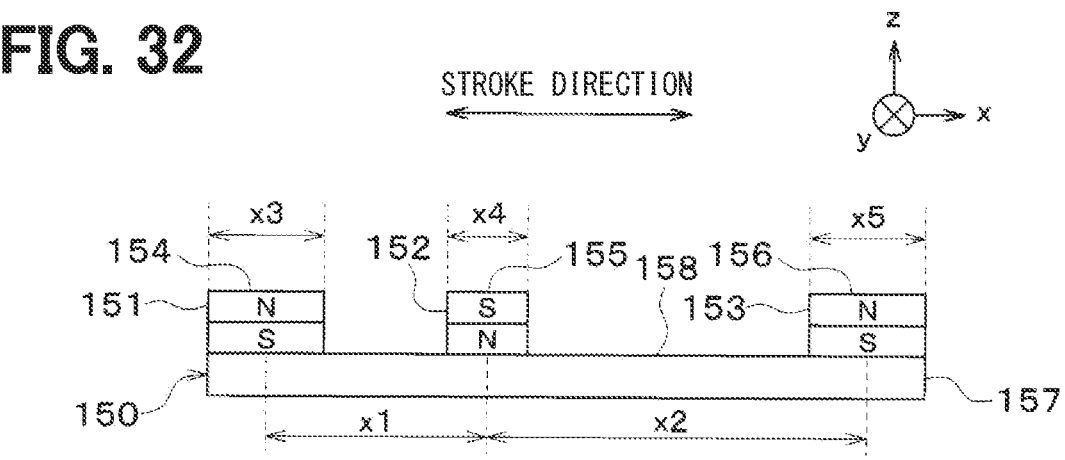
FIG. 32 is a diagram showing, as a modification, a case where magnets are arranged at non-equidistant intervals.

Alternatively, as shown in FIG. 32, the three magnets 151 to 153 may have respectively different widths and may be arranged at non-equidistant intervals. Further, the magnets 151 to 153 may have respectively different heights.

Figure 33:
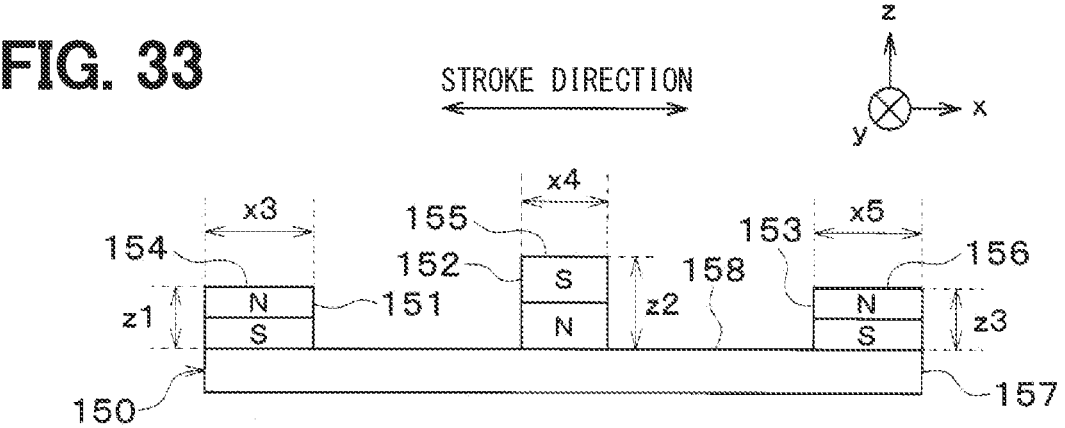
FIG. 33 is a diagram showing, as a modification, a case where respective magnets have different heights.

Alternatively, as shown in FIG. 33, the three magnets 151 to 153 may have respectively different widths and respectively different heights.

Alternatively, the detection object 150 may comprise two magnets 151, 152. In such case, the first width x3 of the first magnetic pole surface 154 of the first magnet 151 and the second width x4 of the second magnetic pole surface 155 of the second magnet 152 are different in the stroke direction. Further, the height of the two magnets 151 and 152 may be respectively different.

Fourth Embodiment

Figure 34:
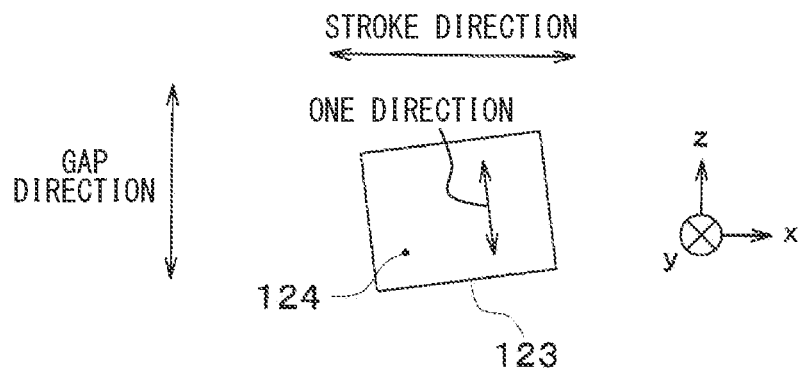
FIG. 34 is a diagram showing a sensor chip according to a fourth embodiment.

In the present embodiment, different portions from the first to third embodiments are mainly described. As shown in FIG. 34, the detector section 111 has a sensor chip 123. The sensor chip 123 has one surface 124 that is in parallel with both of the gap direction and the stroke direction. The sensor chip 123 has one of the surface directions of the one surface 124 set as a direction corresponding to a sine signal.

Further, the sensor chip 123 is fixed to the detector section 111 with the one direction inclined with respect to the stroke direction or the gap direction. That is, the sensor chip 123 is rotated by a certain angle.

Figure 35:
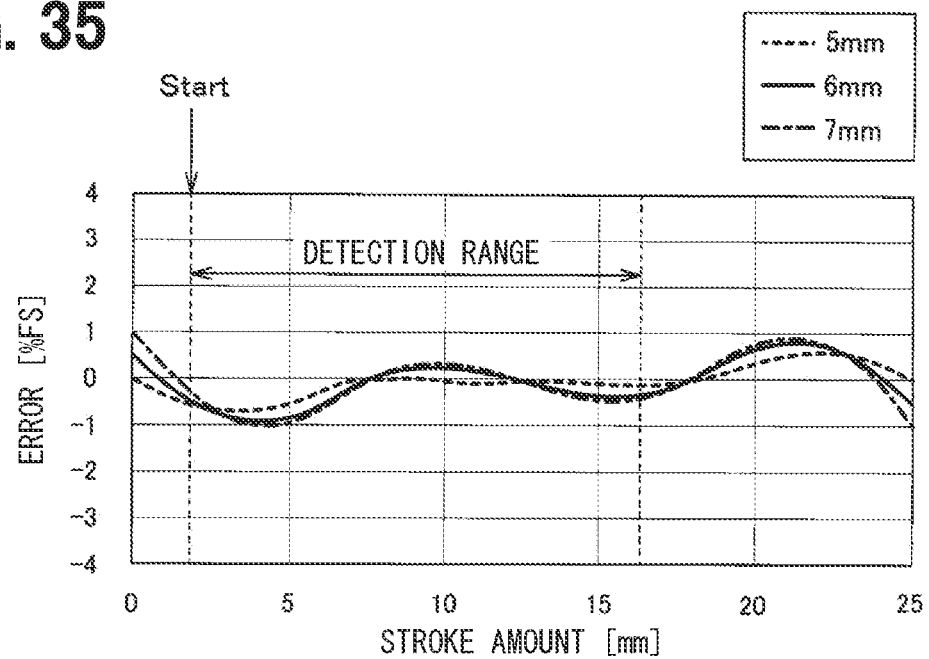
FIG. 35 is a diagram showing an error with respect to the stroke amount in the sensor chip shown in FIG. 34.

The inventors have investigated an error of the position signal as have done in the first embodiment. As the detection object 150, the three magnets 151 to 153 arranged at equal intervals are adopted. The results are shown in FIG. 35. As shown in FIG. 35, the error in the detection range over the entire stroke range is reduced regardless of the gap difference. In addition, a start position of the detection range is shifted to one side where the stroke amount increases as compared with a configuration in which the sensor chip 123 is not rotated.

Figure 36:
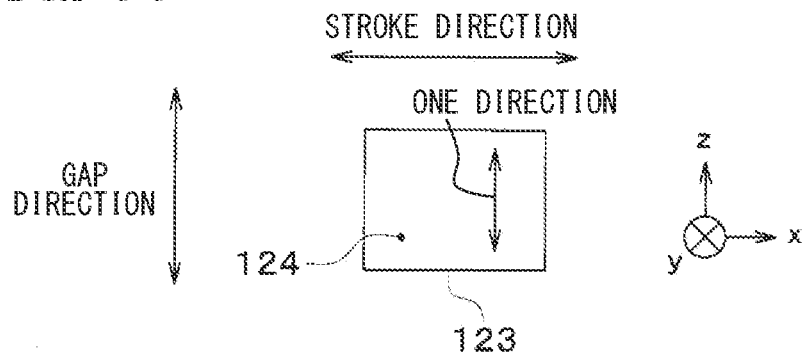
FIG. 36 is a diagram showing, as a comparative example, a case where one direction of the sensor chip is in parallel with a gap direction.
Figure 37:
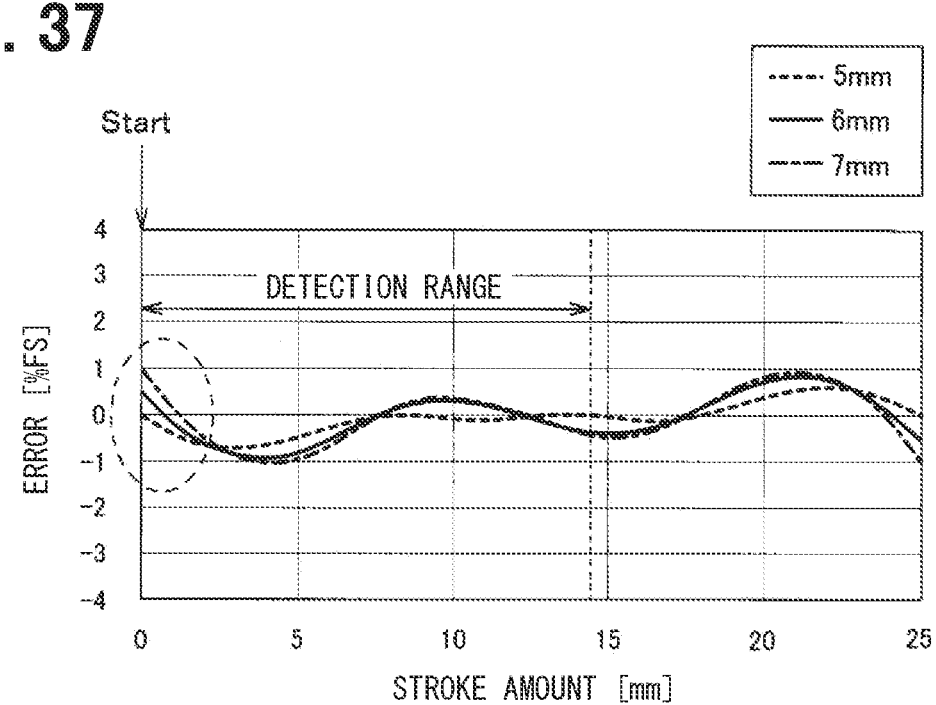
FIG. 37 is a diagram showing an error with respect to the stroke amount of the sensor chip shown in FIG. 36.

As a comparative example, as shown in FIG. 36, one direction of the sensor chip 123 may be set to be in parallel with the gap direction. That is, in the comparative example, the sensor chip 123 is not rotated. In such case, when the detection range of the stroke amount is the same as above, the error near the start position of the detection range becomes larger, regardless of the difference in the gap, as shown in the portion surrounded by the dashed line in FIG. 37.

According to the above results, it can be said that by rotating the sensor chip 123, it is possible to move the detection range to a range with a small error within the entire stroke range. This is because the phase of the detection direction of the respective magnetic detection elements also rotates with the rotation of the sensor chip 123.

As described above, by changing the orientation of the sensor chip 123, it is possible to selectively improve the detection accuracy in the accuracy-required range within the entire stroke range.

As a modification, changing the orientation of the sensor chip 123 can be adopted in the configuration shown in each of the above embodiments, or in a configuration in which the above embodiments are combined. For example, it may be applicable to a case when the two magnets 151 and 152 are adopted, when the heights and widths of the magnets 151 to 153 are respectively different, or when the three magnets 151 to 153 are arranged at non-equidistant intervals.

Fifth Embodiment

Figure 38:
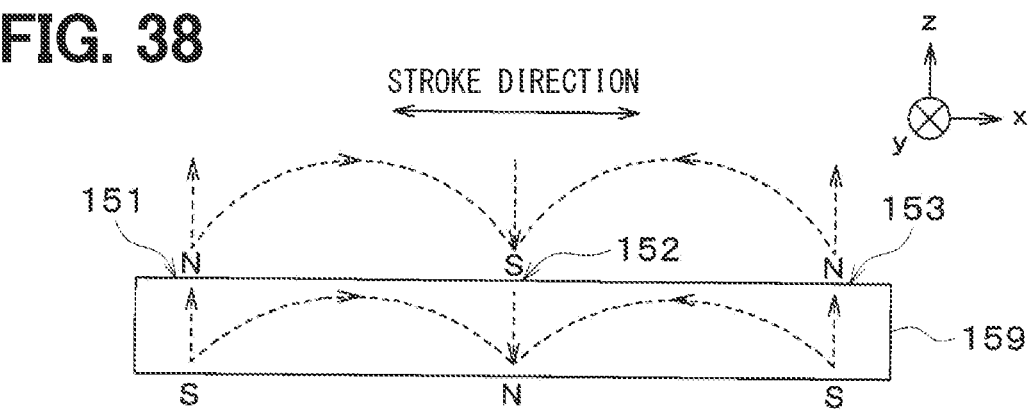
FIG. 38 is a diagram showing a configuration of the respective magnets according to a fifth embodiment.

In the present embodiment, different portions from the above embodiments are mainly described. As shown in FIG. 38, the three magnets 151 to 153 are configured by magnetizing a plastic magnet 159. The plastic magnet 159 contains, for example, ferrite, rare earth elements such as neodymium, samarium cobalt and the like.

The plastic magnet 159 is a molded resin product in which fine magnet particles are mixed with a resin material. The plastic magnet 159 is fixed to the yoke 157. Each of the magnets 151 to 153 is magnetized by polar anisotropic magnetization. The magnets 151 to 153 may also be magnetized as isotropic magnets.

Figure 39:
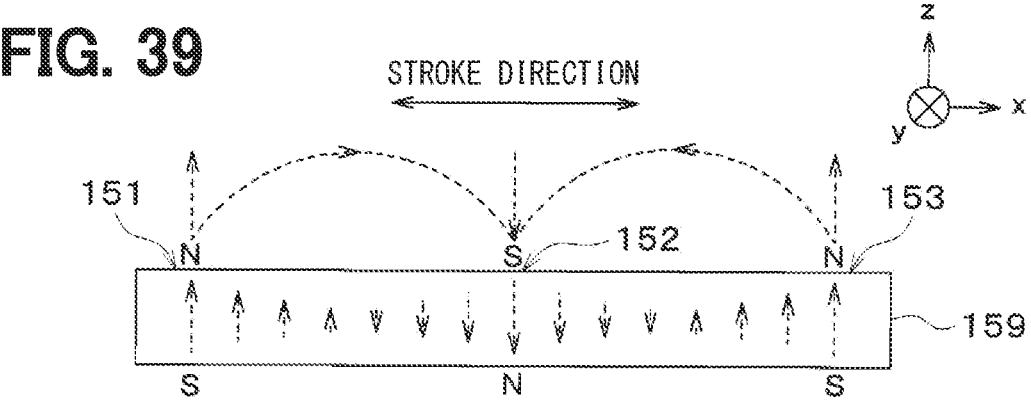
FIG. 39 is a diagram showing, as a modification, a case of gradation magnetization.

As a modification, as shown in FIG. 39, each of the magnets 151 to 153 may be subjected to gradation magnetization. The gradation magnetization is a form of magnetizing the plastic magnet 159 with the magnets 151 to 153 so that the magnets 151 to 153 have different densities. Since the intensity of the magnetic force among the magnets 151 to 153 changes continuously, it is easy to adjust the magnetic force.

Figure 40:
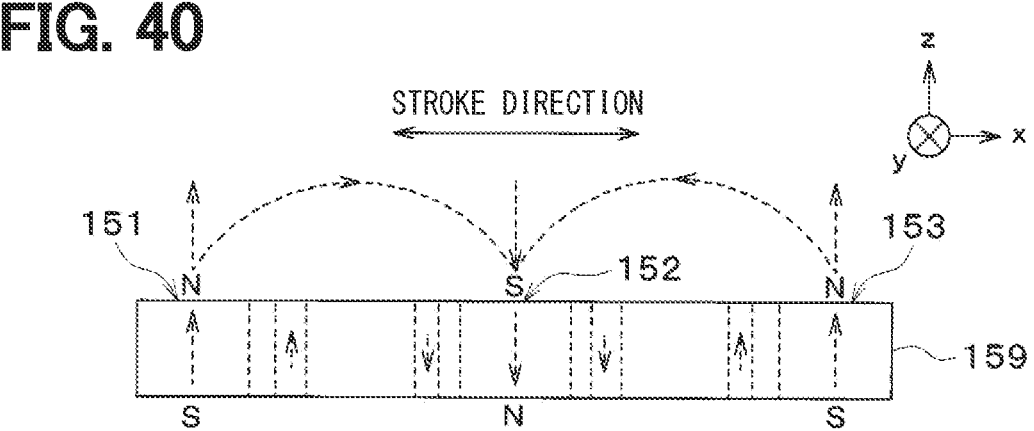
FIG. 40 is a diagram showing, as a modification, a case of multipolar magnetization.

As another modification, as shown in FIG. 40, each of the magnets 151 to 153 may be multi-polarized. As with the gradation magnetization, this makes it easier to adjust the magnetic force.

Figure 41:
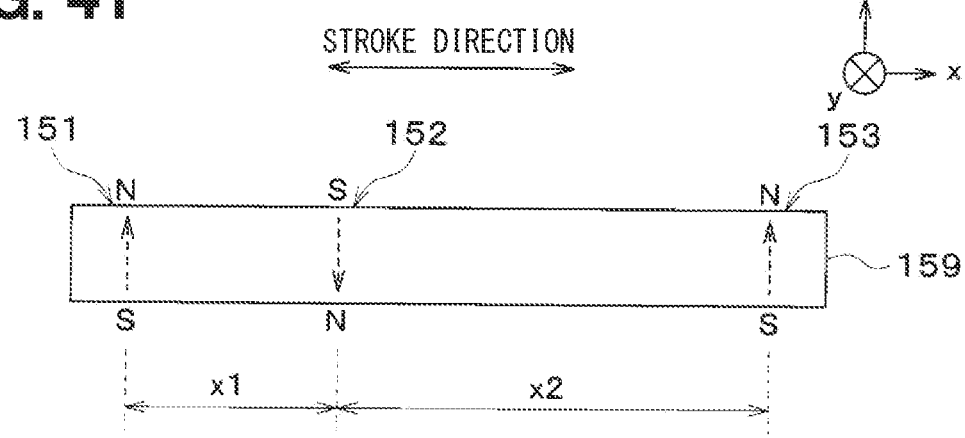
FIG. 41 is a diagram showing, as a modification, a case of magnetization at non-equidistant intervals.

As yet another modification, as shown in FIG. 41, the magnets 151 to 153 may be magnetized at non-equidistant intervals in the stroke direction.

Figure 42:
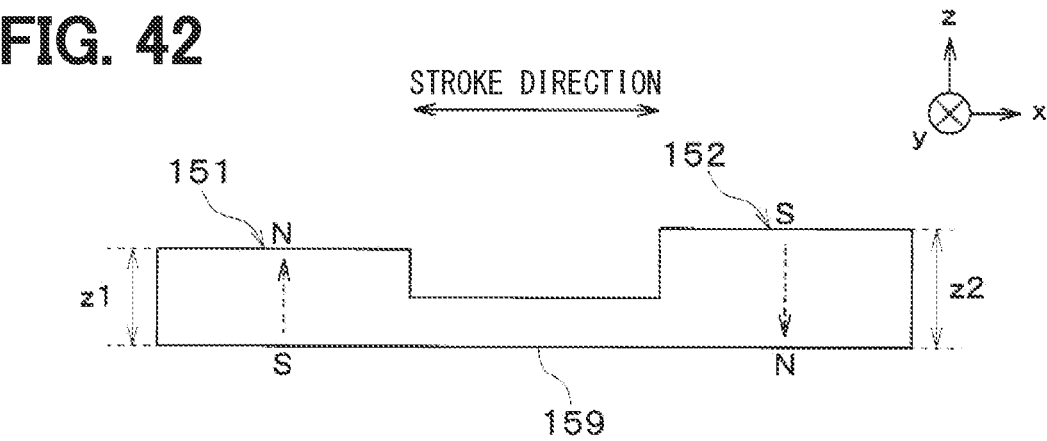
FIG. 42 is a diagram showing, as a modification, a case of shape change of a plastic magnet.

As still yet another modification, as shown in FIG. 42, the plastic magnet 159 may be molded such that the heights of the two magnets 151 and 152 are different. Since the plastic magnet 159 is a resin-molded product, magnets of various shapes can be easily constructed.

Figure 43:
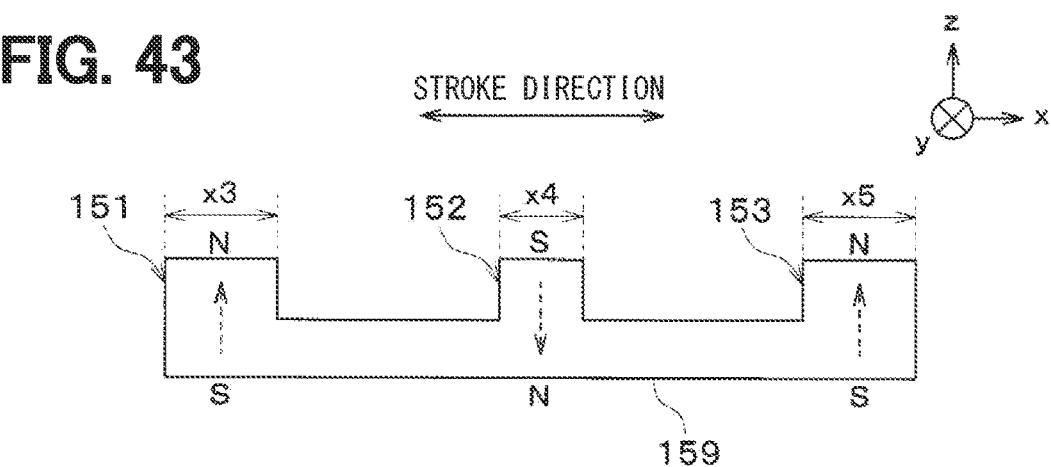
FIG. 43 is another diagram showing, as a modification, a case shape change of a plastic magnet.

As still yet another modification, as shown in FIG. 43, the plastic magnet 159 may be molded such that the three magnets 151 to 153 have different widths.

By providing the magnets 151 to 153 as the magnetization of the plastic magnet 159 as described above, it becomes easy to adjust the magnetic forces and positions of the magnets 151 to 153. In addition, the plastic magnet 159 can be combined with all of the above embodiments, as shown in FIGS. 41 to 43. In addition, it can also be adopted in a configuration in which the above embodiments are combined.

Sixth Embodiment

In the present embodiment, portions different from those of the first embodiment are mainly described. As shown in the upper stage in FIG. 44, a part of the first magnet 151 protrudes along the stroke direction from one end 160 of the one surface 158 of the yoke 157. In addition, the first magnet 151 is arranged such that the first magnetic pole surface 154 is perpendicular to the stroke direction.

A part of the third magnet 153 protrudes along the stroke direction from another end 161 of the one surface 158 of the yoke 157 opposite to the one end 160. In addition, the third magnet 153 is arranged such that the third magnetic pole surface 156 is perpendicular to the stroke direction.

In other words, the first magnetic pole surface 154 and the third magnetic pole surface 156 have opposite poles in the stroke direction with respect to the second magnetic pole surface 155, but are arranged in parallel with the gap direction. In such a case as well, the adjacent magnetic pole surfaces 154 to 156 are arranged to have opposite poles. The magnets 151 to 153 are arranged at non-equidistant intervals in the stroke direction, for example. In addition, the second magnet 152 has a larger height than the first magnet 151 and the third magnet 153.

According to the above configuration, the magnetic vector discharged from the first magnetic pole surface 154 of the first magnet 151 extends along the stroke direction. The magnetic vector is gradually directed upward as distant from the first magnetic pole surface 154 and eventually becomes parallel with the gap direction. The magnetic vector is then inclined with respect to the gap direction and becomes parallel with the stroke direction. After that, the magnetic vector is attracted to the second magnet 152 and tilts with respect to the stroke direction. The magnetic vector discharged from the third magnetic pole surface 156 of the third magnet 153 behaves in the same manner.

Thereby, a magnetic vector in parallel with the gap direction can be created outside the first magnet 151. Similarly, a magnetic vector in parallel with the gap direction can be created outside the third magnet 153. Therefore, the detection range extends from the position where the magnetic vector discharged from the first magnet 151 becomes parallel with the gap direction to the position where the magnetic vector discharged from the third magnet 153 becomes parallel with the gap direction. On the other hand, the body size of the detection object 150 in the stroke direction is the size from the first magnetic pole surface 154 to the third magnetic pole surface 156. Therefore, the detection range can be made larger than the body size of the detection object 150. In other words, the detection object 150 can be made smaller while maintaining the detection range.

Figure 44:
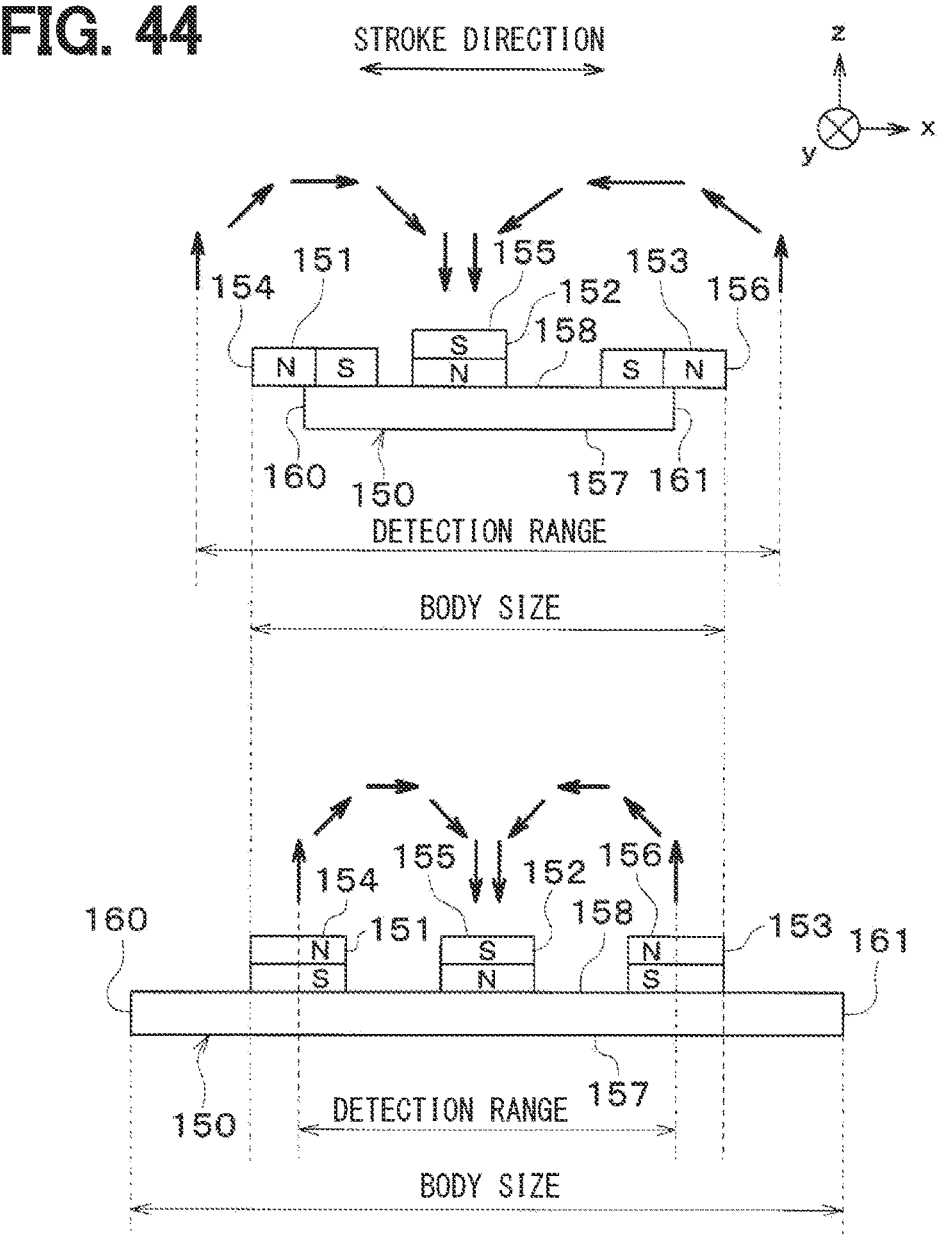
FIG. 44 is a diagram showing in an upper stage a configuration of the detection object according to a sixth embodiment, and showing in a lower stage, as a comparative example, a configuration in which respective magnetic poles are oriented in the same direction.

As a comparative example, as shown in the lower stage in FIG. 44, when the magnetic pole surfaces 154 to 156 of the magnets 151 to 153 are all oriented in the same direction, the magnetic vectors discharged from the first magnet 151 and the third magnet 153 are directed in parallel with the gap direction. Therefore, a part of the first magnet 151, a part of the third magnet 153, and a part of the yoke 157 are positioned outside the magnetic vector. Thus, the detection range in the comparative example is smaller than the body size of the detection object 150.

As described above, by arranging the first magnetic pole surface 154 of the first magnet 151 and the third magnetic pole surface 156 of the third magnet 153 parallel to the gap direction, the body size of the detection object 150 can be reduced.

As a modification, the downsizing of the detection object 150 can be adopted in the configuration shown in each of the above embodiments, or in a configuration in which the above embodiments are combined. For example, the height of the magnets 151 to 153 may be all the same. The width of the magnets 151 to 153 may be respectively different. Further, it can be applied to a configuration in which the orientation of the sensor chip 123 is changed, or to a configuration in which the plastic magnet 159 is magnetized to serve as the magnets 151 to 153.

Seventh Embodiment

Figure 45:
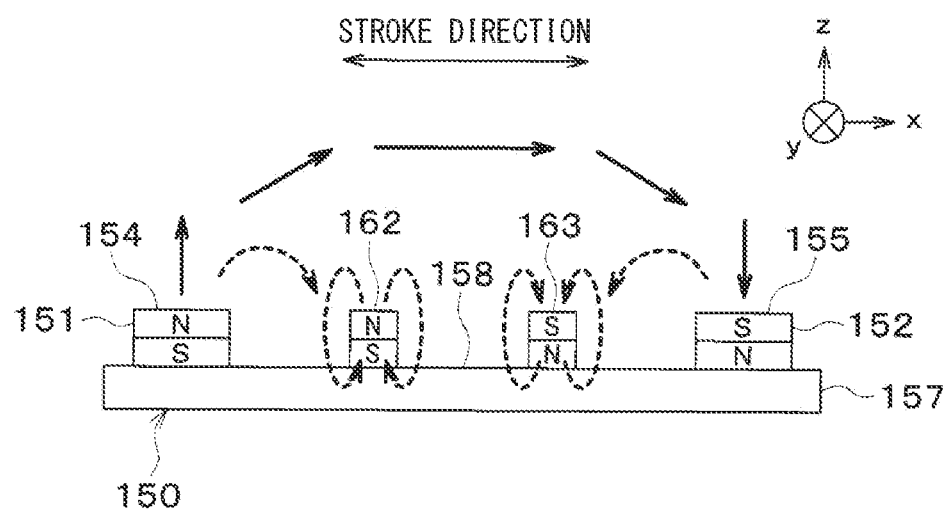
FIG. 45 is a diagram showing a configuration of the detection object according to a seventh embodiment.

In the present embodiment, different portions from the above embodiments are mainly described. As shown in FIG. 45, the detection object 150 includes the first magnet 151, the second magnet 152, a first auxiliary magnet 162 and a second auxiliary magnet 163.

The first auxiliary magnet 162 is arranged at a position on a side of the first magnet 151 between the first magnet 151 and the second magnet 152. The first auxiliary magnet 162 repels the magnetic field corresponding to the first magnetic pole surface 154 of the first magnet 151.

The second auxiliary magnet 163 is arranged at a position on a side of the second magnet 152 between the first magnet 151 and the second magnet 152. The second auxiliary magnet 163 repels the magnetic field corresponding to the second magnetic pole surface 155 of the second magnet 152.

In addition, the height of the auxiliary magnets 151 and 152 is the same as that of the magnets 151 and 152. The width of the auxiliary magnets 151, 152 in the stroke direction is smaller than the width of the magnets 151, 152. The auxiliary magnets 151 and 152 may have other sizes as long as the magnetic path therebetween can be adjusted by the magnets 151 and 152.

When the magnets 151 and 152 are arranged apart from each other, it becomes difficult to form a magnetic path between the magnets 151 and 152. It also affects the detection accuracy within the accuracy-required range. However, according to the above configuration, the auxiliary magnets 151 and 152 maintain the magnetic path between the first magnet 151 and the second magnet 152. Therefore, it is possible to improve the detection accuracy in the accuracy-required range.

In particular, when AMR is used as the magnetoresistive element, the usable electrical angle is 180 degrees. In case of AMR, when the distance between the magnets 151 and 152 is increased to widen the detection range, the magnets 151 and 152 may individually form a closed loop, making it difficult to form a magnetic path between the magnets 151 and 152. However, by providing the auxiliary magnets 151 and 152 between the magnets 151 and 152 to repel the closed-loop magnetic field, the original magnetic path between the magnets 151 and 152 can be easily formed.

Figure 46:
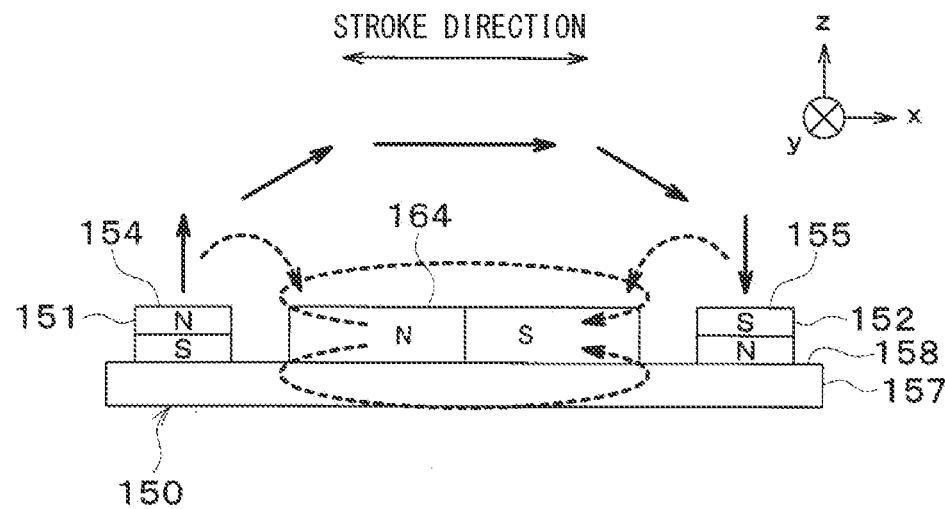
FIG. 46 is a diagram showing, as a modification, a case where one auxiliary magnet is adopted.

As a modification, only one third auxiliary magnet 164 may be arranged between the magnets 151, 152, as shown in FIG. 46. In such case, the N pole of the third auxiliary magnet 164 is arranged on a side of the first magnet 151, and the S pole of the third auxiliary magnet 164 is arranged on a side of the second magnet 152.

Figure 47:
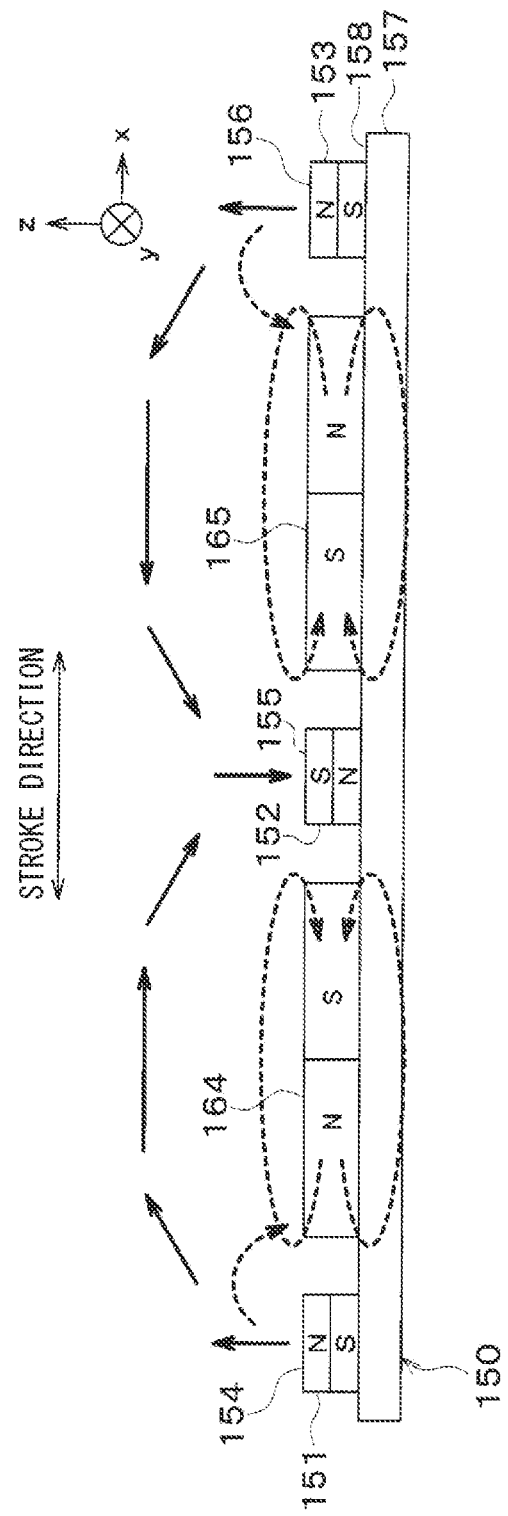
FIG. 47 is a diagram showing, as a modification, a case where auxiliary magnets are adopted at positions between three magnets.

As another modification, as shown in FIG. 47, when the detection object 150 includes the three magnets 151 to 153, the third auxiliary magnet 164 may be arranged between the first magnet 151 and the second magnet 152, and a fourth auxiliary magnet 165 may be arranged between the second magnet 152 and the third magnet 153. In such case, the third auxiliary magnet 164 repels the magnetic field corresponding to the first magnetic pole surface 154 of the first magnet 151, and repels the magnetic field corresponding to the second magnetic pole surface 155 of the second magnet 152. Further, the fourth auxiliary magnet 165 repels the magnetic field corresponding to the second magnetic pole surface 155 of the second magnet 152, and repels the magnetic field corresponding to the third magnetic pole surface 156 of the third magnet 153. Of course, a plurality of the auxiliary magnets 162 to 165 may be arranged at each of positions between the magnets 151 to 153.

Figure 48:
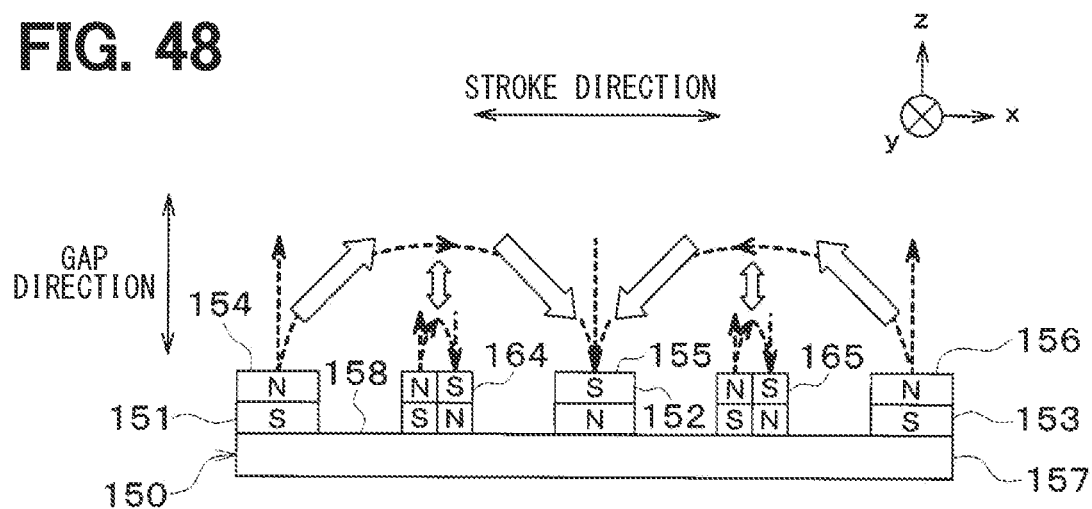
FIG. 48 is a diagram showing, as a modification, a case where multipolar auxiliary magnets are adopted.

As yet another modification, multipolar magnets may be adopted as the third auxiliary magnet 164 and the fourth auxiliary magnet 165, as shown in FIG. 48. The multipolar magnet is a magnet provided with N and S poles not only in the stroke direction but also in the gap direction. Therefore, the inclination of the magnetic vector discharged from the first magnet 151 and the inclination of the magnetic vector drawn into the second magnet 152 can be increased with respect to the stroke direction. That is, it is possible to prevent the magnetic vector between the first magnet 151 and the second magnet 152 from lying. The same is applicable for the magnetic vector between the second magnet 152 and the third magnet 153. Therefore, not only when the gap between the sensor 100 and the detection object 150 is large, but also when the gap is small, the detection accuracy within the accuracy-required range can be improved.

Figure 49:
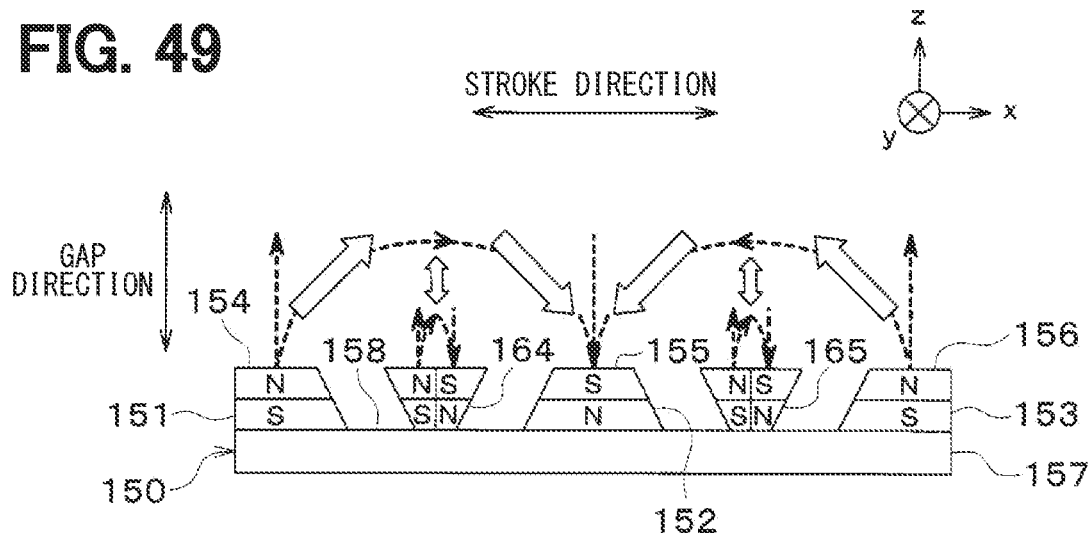
FIG. 49 is another diagram showing, as a modification, a case where the multipolar auxiliary magnets are adopted.

Moreover, as shown in FIG. 49, each of the magnets 151 to 153 and each of the auxiliary magnets 151 and 152 may have a tapered surface at least as a surface facing the adjacent magnet. In each of the magnets 151 to 153, the width of the magnetic pole surfaces 154 to 156 in the stroke direction is smaller than the width of the surface fixed to the yoke 157. That is, the upper side of each of the magnets 151 to 153 is smaller than the lower side thereof. Conversely, each of the auxiliary magnets 151 and 152 has a surface width in the stroke direction larger on a side of the sensor 100 than the surface width on a side fixed to the yoke 157. That is, the upper side of each of the auxiliary magnets 151, 152 is larger than the lower side thereof. Each of the magnets 151 to 153 and each of the auxiliary magnets 151, 152 are, for example, a truncated quadrangular pyramid.

Thereby, the magnetic vectors between the first magnet 151 and the second magnet 152 and between the second magnet 152 and the third magnet 153 can be floated arbitrarily in the gap direction. In other words, the magnetic field between the first magnet 151 and the second magnet 152 can be repelled by the magnetic field of the third auxiliary magnet 164. The magnetic field between the second magnet 152 and the third magnet 153 can be repelled by the magnetic field of the fourth auxiliary magnet 165. Moreover, even when the gap between the sensor 100 and the detection object 150 is small, the magnetic flux density between the first magnet 151 and the second magnet 152, the magnetic flux density between the second magnet 152 and the third magnet 153, the magnetic flux density above each of the auxiliary magnets 164 and 165 can be increased. Therefore, it is possible to improve the detection accuracy in the accuracy-required range. The configurations shown in FIGS. 48 and 49 can also be applied when the detection object 150 has the first magnet 151, the second magnet 152 and the third auxiliary magnet 164.

Figure 50:
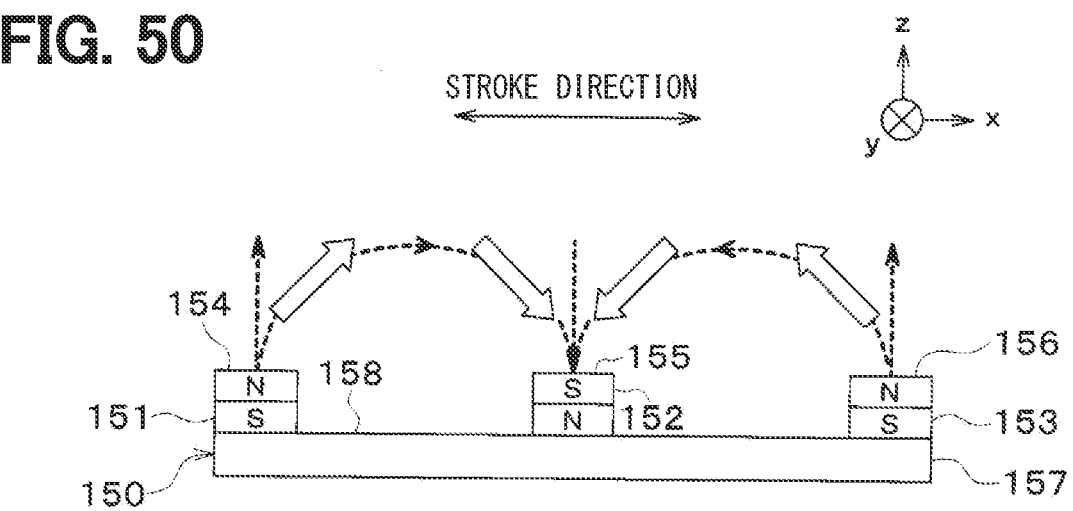
FIG. 50 is a diagram showing, as a comparative example, a case where widths of respective faces of the magnetic poles is the same.

As a comparative example, as shown in FIG. 50, when the widths of the magnets 151 to 153 in the stroke direction are all the same, the magnetic vector flattens than ideal since the lines of the magnetic force between the first magnet 151 and the second magnet 152 respectively make the shortest path. That is, the magnetic vector is aligned along the stroke direction. The same is applicable for the magnetic vector between the second magnet 152 and the third magnet 153. Therefore, with the configuration shown in FIG. 50, the required detection accuracy can only be achievable when the gap between the sensor 100 and the detection object 150 is large.

The third auxiliary magnet 164 of the present embodiment corresponds to a first auxiliary magnet, and the fourth auxiliary magnet 165 corresponds to a second auxiliary magnet.

As a modification, the configuration in which the detection object 150 has the auxiliary magnets 162 to 165 can be adopted in the configuration shown in each of the above embodiments, or in a configuration in which the above embodiments are combined. For example, when the plastic magnet 159 is magnetized to implement the magnets 151 to 153, the auxiliary magnets 162 to 165 may also be implemented as magnetization at corresponding positions or portions.

Eighth Embodiment

Figure 51:
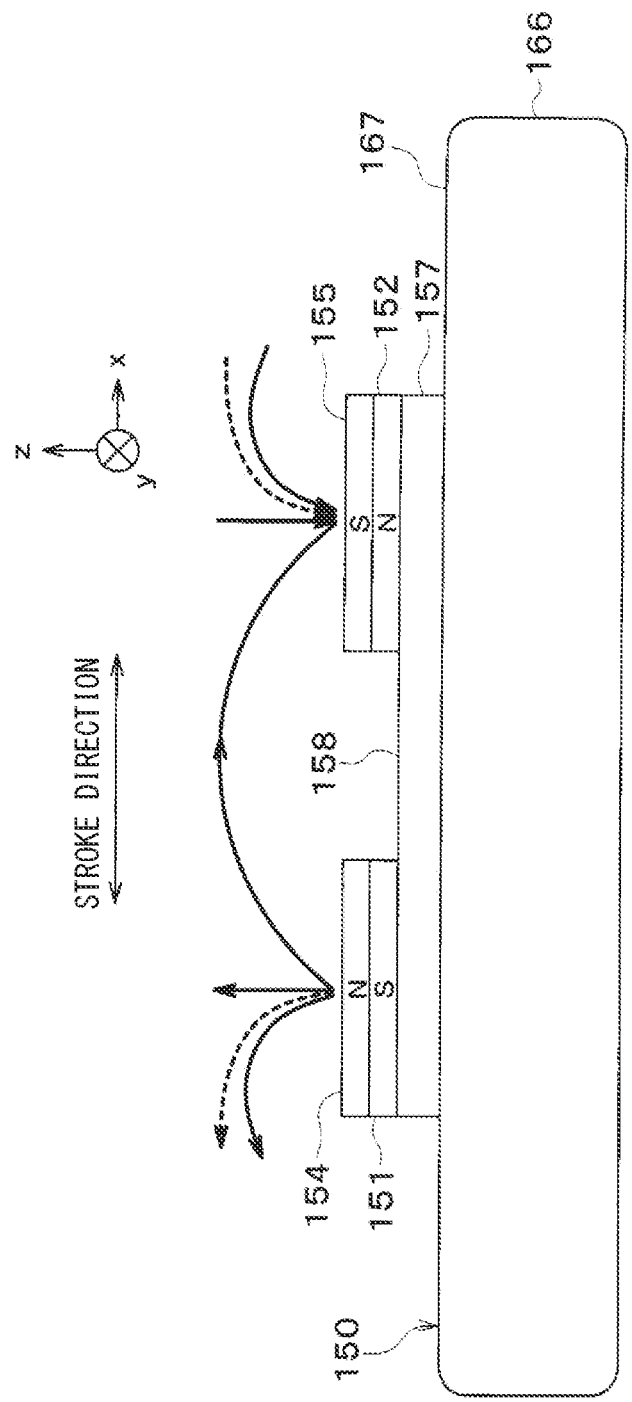
FIG. 51 is a diagram showing a configuration of the detection object according to an eighth embodiment.

In the present embodiment, different portions from the above embodiments are mainly described. As shown in FIG. 51, the detection object 150 includes the first magnet 151, the second magnet 152, the yoke 157 and a shaft 166. The shaft 166 is a magnetic movable component included in the drive unit 12.

The shaft 166 is longer than the yoke 157 in the stroke direction. The length of the shaft 166 in the stroke direction is, for example, 67 mm, and the length of the yoke 157 is, for example, 27 mm. The yoke 157 is fixed to an outer peripheral surface 167 of the shaft 166.

As in the first embodiment, the inventors has examined errors in position signals when the yoke 157 is fixed to the shaft 166 and when it is not fixed. Further, the inventors have investigated changes in the error in the maximum stroke amount when the length of the shaft 166 is changed. These results are shown in FIGS. 52 to 54.

Figure 52:
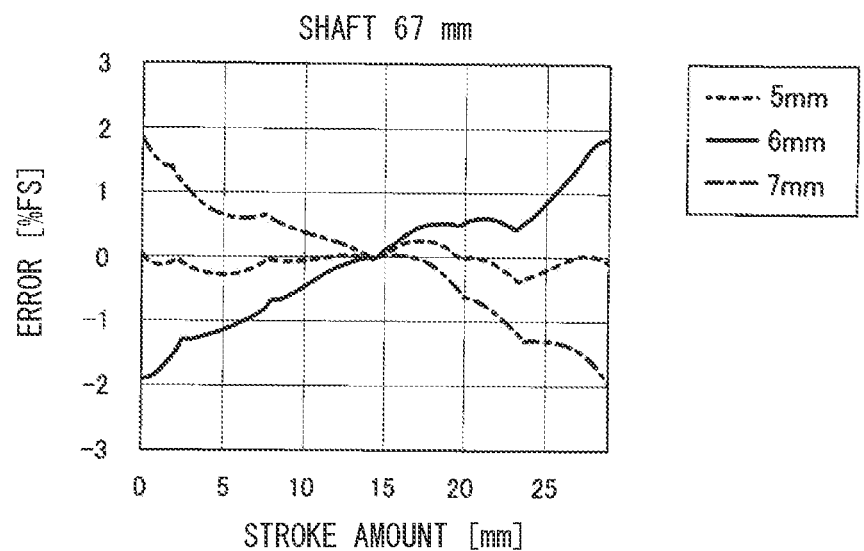
FIG. 52 is a diagram showing an error with respect to the stroke amount when the detection object has a shaft.
Figure 53:
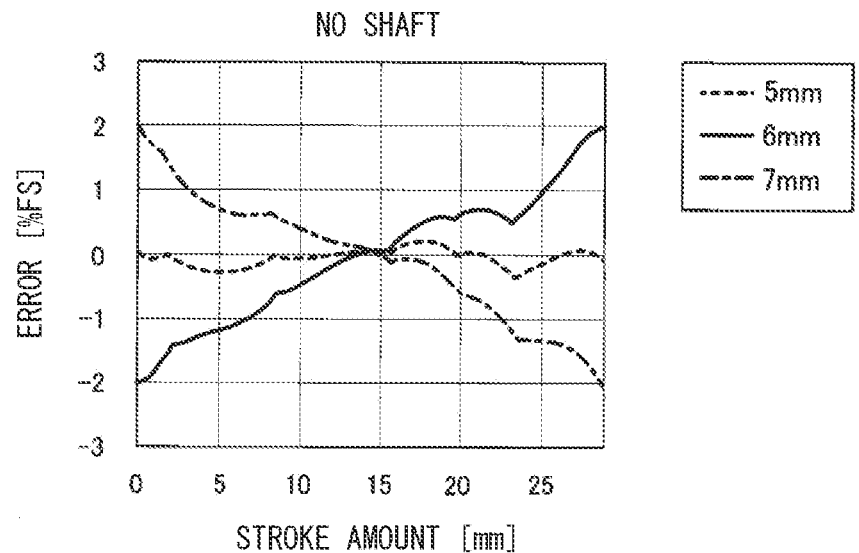
FIG. 53 is a diagram showing, as a comparative example, an error with respect to the stroke amount when the detection object does not have a shaft.
Figure 54:
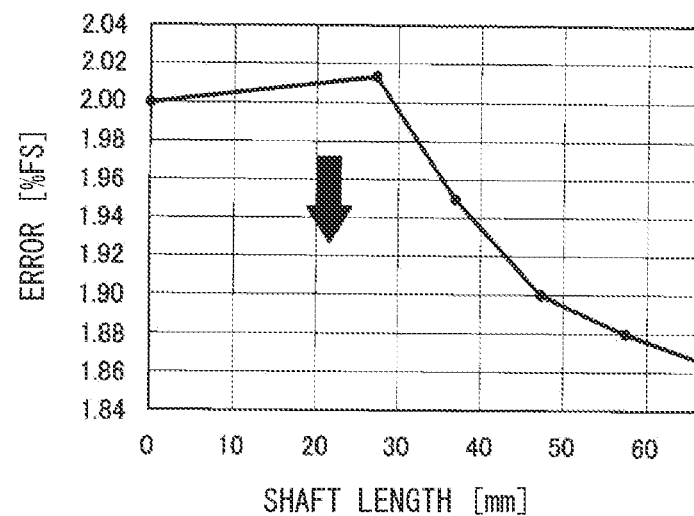
FIG. 54 is a diagram showing a relationship of an error versus a shaft length at a maximum stroke.

As shown in FIGS. 52 and 53, the presence or absence of the shaft 166 caused a difference in the error at the end of the stroke range. FIG. 54 shows the error when the gap is set to 6 mm. The error remained nearly constant until the shaft 166 reached the length of the yoke 157, as shown in FIG. 54. However, as the shaft 166 became longer than the yoke 157, the error became smaller.

This is because the magnetic vectors discharged from the magnets 151, 152 are absorbed into a portion of the shaft 166 near the magnets 151, 152 when the shaft 166 is lengthened in the stroke direction. As a result, the curvature of the dashed-line magnetic vector shown in FIG. 51 increases similarly to the curvature of the solid-line magnetic vector. That is, the range in which the magnetic vector rotates becomes wider. As a result, the usable range of the electrical angle is widened, and the detection range can be widened. Along with the above, there is also the merit that the full-scale error is also reduced.

As described above, by fixing the yoke 157 to the shaft 166, it is possible to selectively improve the detection accuracy in the accuracy-required range within the entire stroke range.

As a modification, the configuration in which the yoke 157 is fixed to the shaft 166 may be adopted in the configuration shown in each of the above embodiments, or in a configuration in which the above embodiments are combined.

Ninth Embodiment

In the present embodiment, different portions from the above embodiments are mainly described. As shown in FIG.

55, the detection object 150 includes the first magnet 151 and the yoke 157. The yoke 157 has protrusions 168, 169. The protrusions 168, 169 are positioned outside the first magnet 151 in the stroke direction. The protrusions 168 and 169 protrude from the one surface 158 of the yoke 157 along the gap direction.

Moreover, the protrusions 168 and 169 are higher than the first magnet 151 with respect to the one surface 158 of the yoke 157. The height of the first magnet 151 with respect to the one surface 158 of the yoke 157 is, for example, 3 mm, and the height of the protrusions 168 and 169 is, for example, 6 mm.

Figure 56:
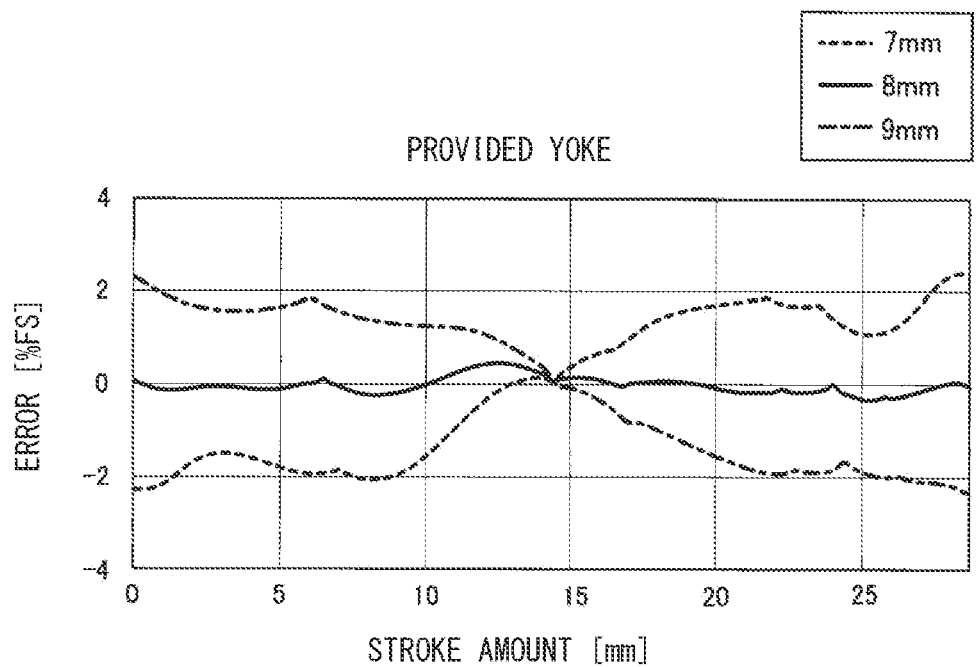
FIG. 56 is a diagram showing an error with respect to the stroke amount when a yoke has a protrusion.
Figure 57:
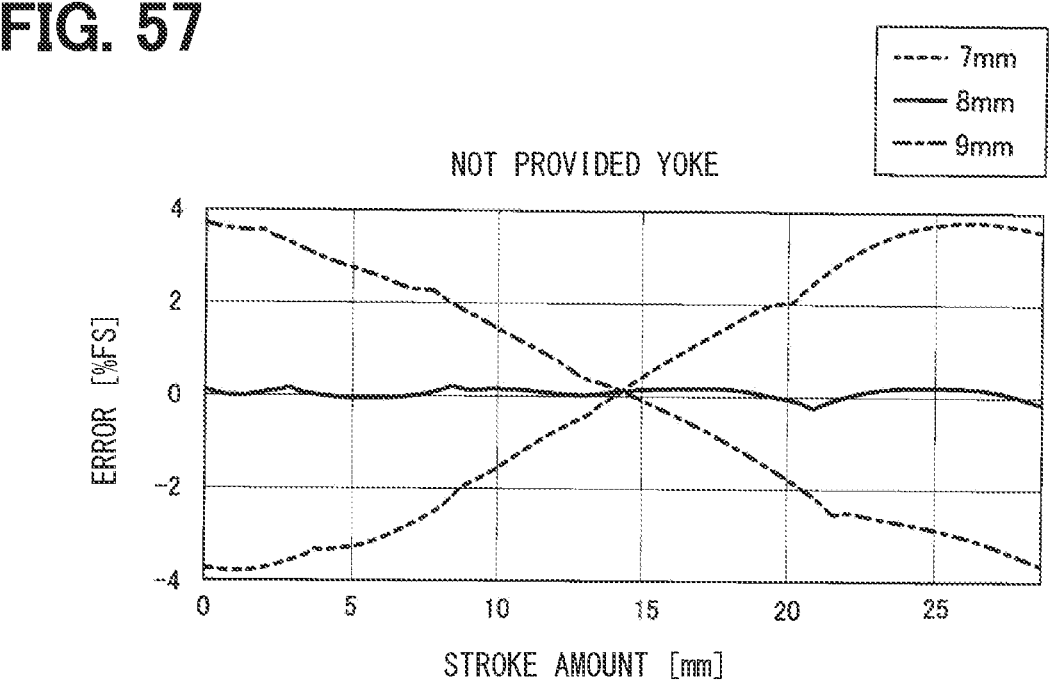
FIG. 57 is a diagram showing, as a comparative example, an error with respect to the stroke amount when the yoke has no protrusion.

As in the first embodiment, the inventors have examined errors in the position signals when the yoke 157 has the protrusions 168 and 169 and when it does not. These results are shown in FIGS. 56 and 57. As shown in FIGS. 56 and 57, the error at the ends of the stroke range is smaller when the yoke 157 has the protrusions 168 and 169 than when it does not.

Figure 55:
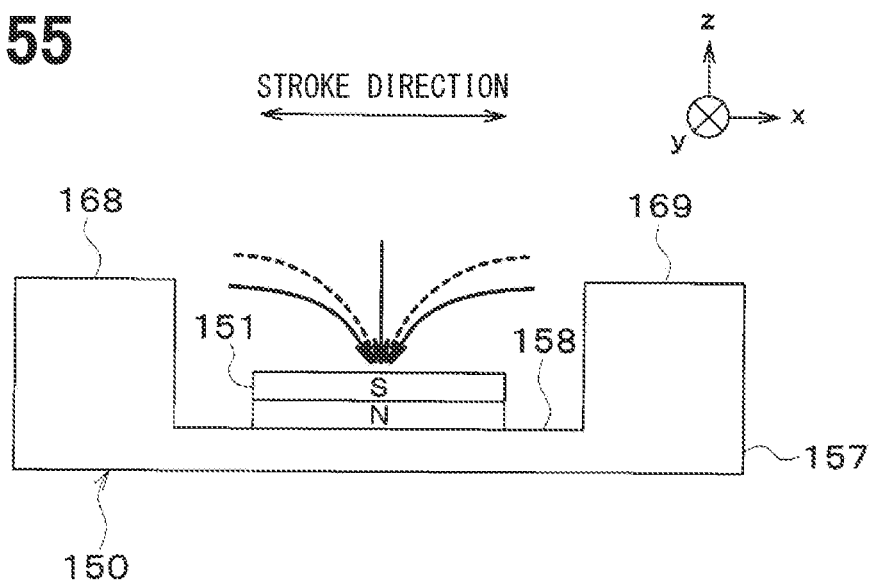
FIG. 55 is a diagram showing a configuration of the detection object according to a ninth embodiment.

This is because the magnetic vector drawn into the first magnet 151 is drawn into the protrusions 168 and 169. As a result, the curvature of the magnetic vector indicated by the dashed line shown in FIG. 55 changes like the curvature of the magnetic vector indicated by the solid line. As a result, the usable range of electrical angle is widened, and the detection accuracy of the entire stroke range or the accuracy-required range can be selectively improved.

Figure 58:
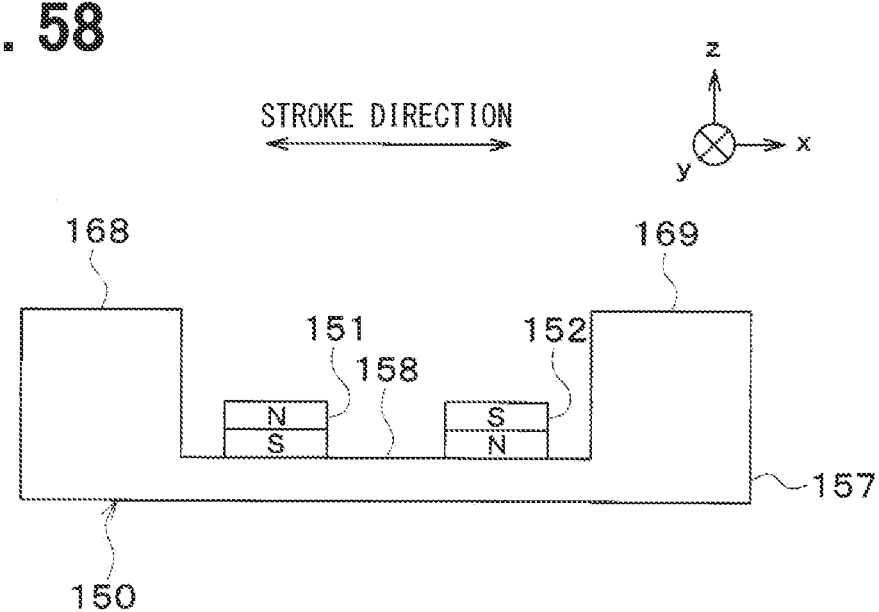
FIG. 58 is a diagram showing a case where the detection object has a plurality of magnets.

As a modification, the detection object 150 may comprise the two magnets 151, 152, as shown in FIG. 58. In such case, the protrusion 168 is arranged outside the first magnet 151 and the protrusion 169 is arranged outside the second magnet 152. When the detection object 150 has the three magnets 151 to 153, the protrusion 169 is arranged outside the third magnet 153. The configuration in which the yoke 157 has the protrusions 168 and 169 may be adopted in a configuration other than the sixth embodiment among the above-described embodiments, or in the combination of the above-described configurations other than the sixth embodiment.

Tenth Embodiment

Figure 59:
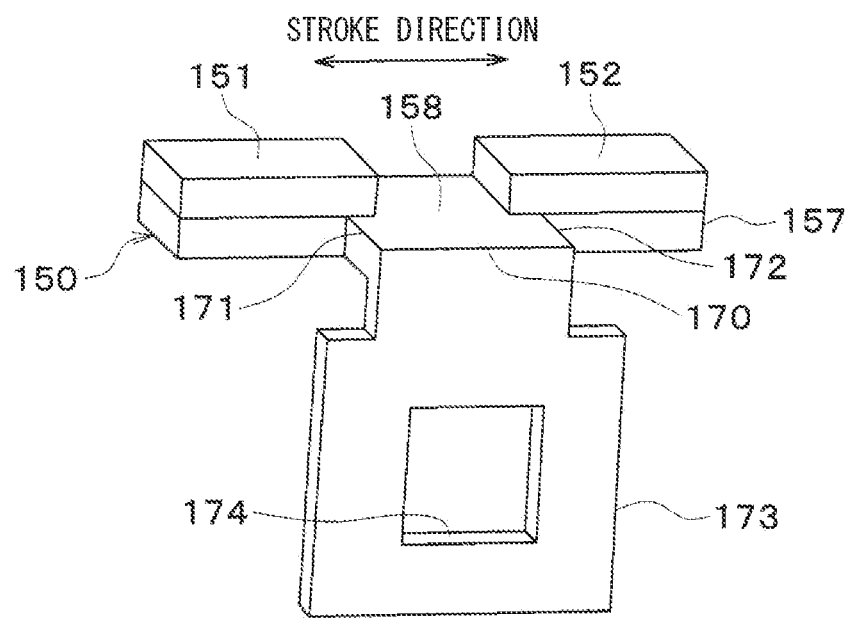
FIG. 59 is a perspective view showing a configuration of the detection object according to a tenth embodiment.
Figure 60:
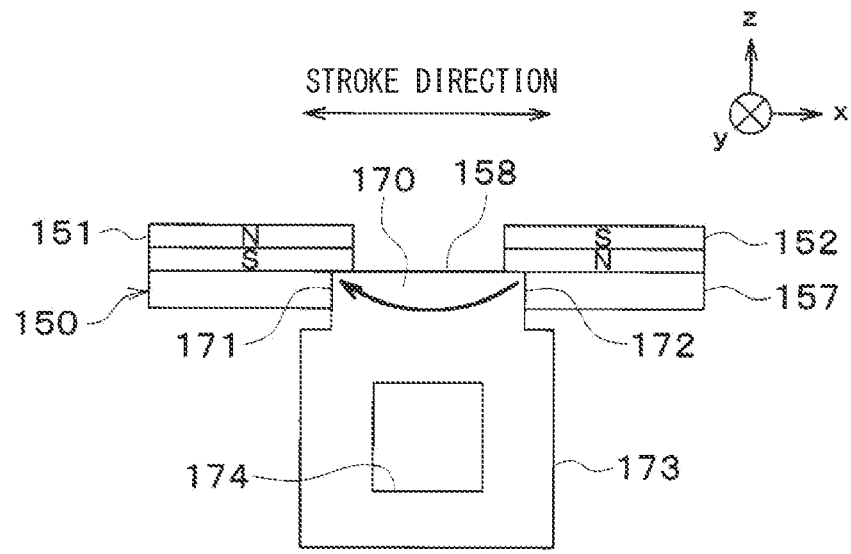
FIG. 60 is a front view of the detection object shown in FIG. 59.
Figure 61:
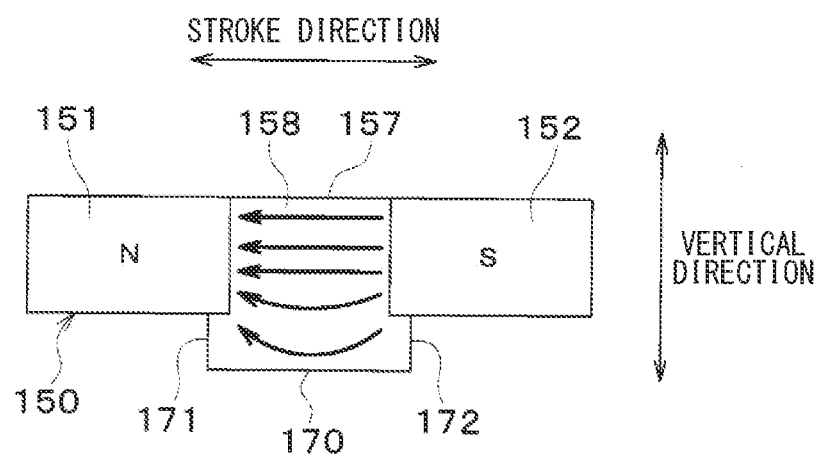
FIG. 61 is a top view of the detection object shown in FIG. 59.

In the present embodiment, different portions from the above embodiments are mainly described. As shown in FIGS. 59 to 61, the detection object 150 includes the first magnet 151, the second magnet 152, and the yoke 157. The yoke 157 has a mounting portion 170.

The mounting portion 170 is a portion of the yoke 157 between the magnets 151 and 152 that protrudes perpendicularly to the stroke direction in the surface direction of the one surface 158. The mounting portion 170 relieves magnetic saturation in the portion between the magnets 151 and 152 of the yoke 157, i.e., the portion where magnetic saturation is likely to occur.

The mounting portion 170 has overlapping portions 171 and 172 and a fixing portion 173. The overlapping portions 171 and 172 are portions that partially overlap with portions of the magnets 151 and 152 in the vertical direction. The overlapping portion 171 overlaps in the vertical direction with an end of the first magnet 151 on a side of second magnet 152. The overlapping portion 172 overlaps in the vertical direction with an end of the second magnet 152 on a side of first magnet 151. The fixing portion 173 is a portion in which a screw hole 174 is formed to be fixed to a movable component of the drive unit 12 or the like.

Figure 62:
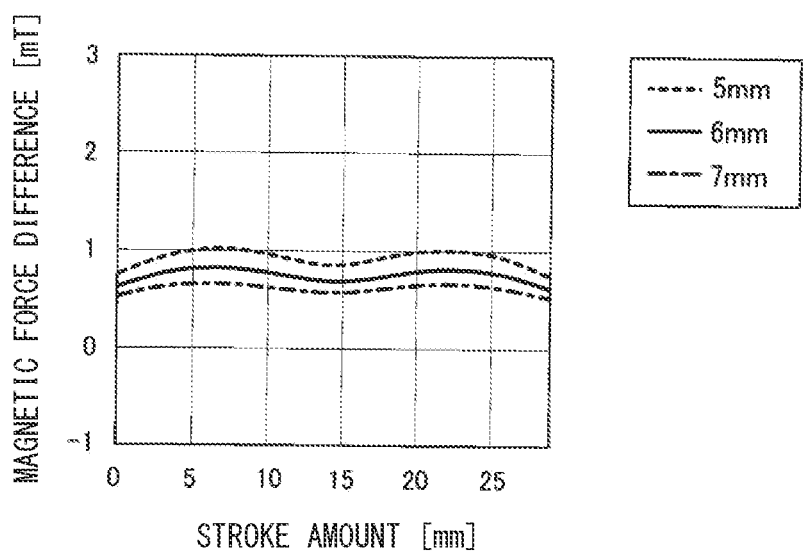
FIG. 62 is a diagram showing an error with respect to the stroke amount in case of the detection object shown in FIG. 59.

The inventors have investigated the difference in a positional magnetic force between the case where the yoke 157 has the mounting portion 170 between the magnets 151 and 152 and the case where it does not, as in the first embodiment. The results are shown in FIG. 62. In addition, the difference in the positional magnetic force between the case where the yoke 157 has the mounting portion 170 at the position corresponding to the second magnet 152 and the case where it does not have the mounting portion 170 is examined. The results are shown in FIG. 63.

As shown in FIG. 62, the difference in the positional magnetic force between the case where the yoke 157 has the mounting portion 170 between the magnets 151 and 152 and the case where the yoke 157 does not have the mounting portion 170 is almost constant throughout the stroke range. This is because the cross-sectional area of the yoke 157 between the magnets 151 and 152 is increased by the mounting portion 170, thereby making a part of the magnetic force lines flow from the second magnet 152 to the first magnet 151 via the mounting portion 170, as shown by the arrow in FIGS. 60 and 61. Thus, the mounting portion 170 is capable of reducing magnetic saturation between the magnets 151 and 152 of the yoke 157. Since the mounting portion 170 has overlapping portions 171 and 172, the magnetic force lines can be easily drawn into the mounting portion 170, which is also effective in alleviating magnetic saturation.

Figure 63:
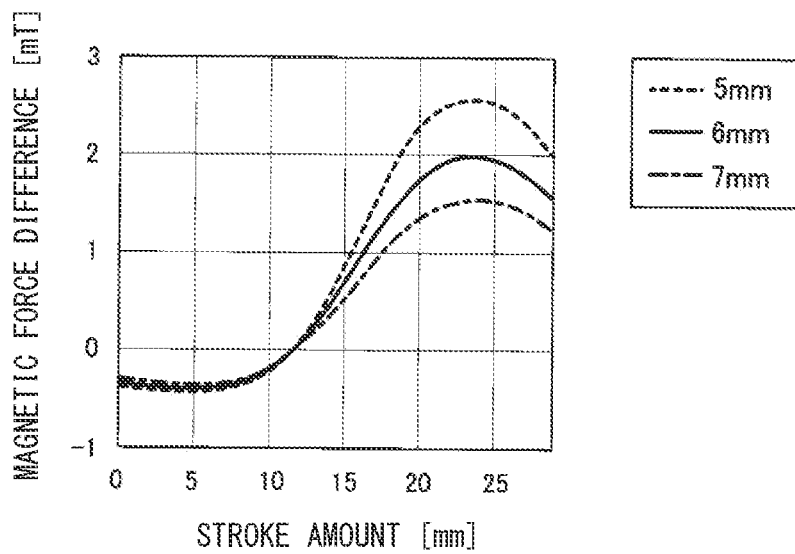
FIG. 63 is a diagram showing an error with respect to the stroke amount when a mounting portion is arranged on one side close to a second magnet.

On the other hand, as shown in FIG. 63, the difference in the positional magnetic force between the case where the yoke 157 has the mounting portion 170 at the position corresponding to the second magnet 152 and the case where it does not have increased at the position corresponding to the second magnet 152. That is, since the magnetic force lines tend to flow to the position corresponding to the second magnet 152, the magnetic force increased. This means that the difference in the positional magnetic force becomes large only at the position where the mounting portion 170 is arranged. Thus, when the position of the mounting portion 170 on the yoke 157 is not appropriate, the effect of alleviating magnetic saturation cannot be acquired.

As described above, since the yoke 157 has the mounting portion 170, the magnetic characteristics inside the yoke 157 can be improved. Therefore, it is possible to selectively improve the detection accuracy in the accuracy-required range or at the accuracy-required position. Note that the mounting portion 170 does not have to have the overlapping portions 171 and 172.

As a modification, the mounting portion 170 may be provided at two positions at the ends in the vertical direction between the magnets 151 and 152 of the yoke 157.

As a modification, the configuration in which the yoke 157 has the mounting portion 170 may be adopted in the configuration shown in each of the above embodiments, or in a configuration in which the above embodiments are combined. For example, when the detection object 150 includes the three magnets 151 to 153, the mounting portion 170 is provided as protrusions as a portion of the yoke 157 between two adjacent magnets among the magnets 151 to 153, which respectively extend in a direction perpendicular to the stroke direction in the surface direction of the one surface 158 of the yoke 157.

The present disclosure is not limited to the embodiments described above, and various modifications can be made as follows within a range not departing from the spirit of the present disclosure.

For example, the application of the sensor 100 is not limited to a vehicle, but it may be widely used in an industrial robot, a manufacturing equipment, or the like, for detecting the rotational position of a movable component. In addition, the sensor 100 may have a configuration in which a redundant function is not provided.

Although the present disclosure has been described in accordance with the embodiments, it is understood that the present disclosure is not limited to the embodiments and structures disclosed therein. The present disclosure incorporates various modifications and variations within the scope of equivalents. In addition, various combinations and forms, and other combinations and forms including one more or less element, and more or less than the foregoing are also included in the scope and concept of the present disclosure.

What is claimed is:

1. A linear position sensor configured to detect a position of a detection object in a stroke direction, the detection object being organized such that a plurality of magnets are spaced apart from each other along the stroke direction, and such that adjacent magnetic pole surfaces of the plurality of magnets have opposite poles, the linear position sensor comprising:
    a detector arranged with a gap in a gap direction against a magnetic pole surface of each of the plurality of magnets, the detector configured to acquire, as a detection signal of a phase corresponding to the position of the plurality of magnets, a sine signal representing a sine function and a cosine signal representing a cosine function, based on a change in a magnetic field received from the plurality of magnets according to movement of the detector relative to the detection object in the stroke direction; and
    a signal processor configured to
        acquire the sine signal and the cosine signal from the detector,
        generate, based on the sine signal and the cosine signal, an arctangent signal that represents an arctangent function and corresponds to a stroke amount of the detection object relative to the detector, and
        acquire the arctangent signal as a position signal that indicates the position of the detection object,
    wherein
    the detection object includes a yoke that is magnetic and having one surface on which the plurality of magnets are arranged,
    the plurality of magnets include a first magnet having a first magnetic pole surface, a second magnet having a second magnetic pole surface, and a third magnet having a third magnetic pole surface,
    the second magnet is arranged at a position between the first magnet and the third magnet, and
    the first magnet, the second magnet, and the third magnet are arranged on the one surface of the yoke, such that a first interval between the first magnet and the second magnet and a second interval between the second magnet and the third magnet are different from each other.

2. The linear position sensor according to claim 1, wherein
    the first magnet has a part, which protrudes along the stroke direction from one end of the one surface of the yoke and has the first magnetic pole surface arranged perpendicular to the stroke direction, and
    the third magnet has a part, which protrudes along the stroke direction from an other end of the one surface of the yoke opposite to the one end and has the third magnetic pole surface arranged perpendicular to the stroke direction.

3. The linear position sensor according to claim 1, wherein
    the yoke has a protrusion protruding along the gap direction from the one surface at a position outside the plurality of magnets in the stroke direction, and
    with respect to the one surface, a height of the protrusion is higher than the plurality of magnets.

4. The linear position sensor according to claim 1, wherein
    in the gap direction, with respect to the one surface of the yoke as a reference, at least one of a first height of the first magnetic pole surface of the first magnet, a second height of the second magnetic pole surface of the second magnet, or a third height of the third magnetic pole surface of the third magnet is different from an other of the first height, the second height, and the third height.

5. The linear position sensor according to claim 1, wherein
    in the stroke direction, at least one of a first width of the first magnetic pole surface of the first magnet, a second width of the second magnetic pole surface of the second magnet, or a third width of the third magnetic pole surface of the third magnet is different from an other of the first width, the second width, and the third width.

6. The linear position sensor according to claim 1, wherein
    the plurality of magnets include a first auxiliary magnet, which is positioned between the first magnet and the second magnet, and a second auxiliary magnet, which is positioned between the second magnet and the third magnet,
    the first auxiliary magnet is arranged to repel the magnetic field corresponding to the first magnetic pole surface of the first magnet and to repel the magnetic field corresponding to the second magnetic pole surface of the second magnet, and
    the second auxiliary magnet is arranged to repel the magnetic field corresponding to the second magnetic pole surface of the second magnet and to repel the magnetic field corresponding to the third magnetic pole surface of the third magnet.

7. The linear position sensor according to claim 1, wherein
    in the gap direction, with respect to the one surface of the yoke as a reference, a first height of the first magnetic pole surface of the first magnet and a second height of the second magnetic pole surface of the second magnet are different from each other.

8. The linear position sensor according to claim 1, wherein
    in the stroke direction, a first width of the first magnetic pole surface of the first magnet and a second width of the second magnetic pole surface of the second magnet are different from each other.

9. The linear position sensor according to claim 1, wherein
    the plurality of magnets include an auxiliary magnet positioned between the first magnet and the second magnet, and
    the auxiliary magnet is arranged to repel the magnetic field corresponding to the first magnetic pole surface of the first magnet and to repel the magnetic field corresponding to the second magnetic pole surface of the second magnet.

10. A linear position sensor configured to detect a position of a detection object in a stroke direction, the detection object being organized such that a plurality of magnets are spaced apart from each other along the stroke direction, and such that adjacent magnetic pole surfaces of the plurality of magnets have opposite poles, the linear position sensor comprising:

a detector arranged with a gap in a gap direction against a magnetic pole surface of each of the plurality of magnets, the detector configured to acquire, as a detection signal of a phase corresponding to the position of the plurality of magnets, a sine signal representing a sine function and a cosine signal representing a cosine function, based on a change in a magnetic field received from the plurality of magnets according to movement of the detector relative to the detection object in the stroke direction; and a signal processor configured to
    acquire the sine signal and the cosine signal from the detector,
    generate, based on the sine signal and the cosine signal, an arctangent signal that represents an arctangent function and corresponds to a stroke amount of the detection object relative to the detector, and
    acquire the arctangent signal as a position signal that indicates the position of the detection object, wherein the detection object includes a yoke that is magnetic and having one surface, the yoke has a protrusion protruding along the gap direction from the one surface at a position outside the plurality of magnets in the stroke direction, and with respect to the one surface, a height of the protrusion is higher than the plurality of magnets.

11. The linear position sensor according to claim 1, wherein the detector includes a sensor chip having one surface in parallel with the gap direction and the stroke direction, one direction of surface directions of the one surface of the detector is set as a direction corresponding to the sine signal, and the sensor chip is fixed to the detector such that the one direction is inclined relative to the stroke direction.

12. The linear position sensor according to claim 1, wherein the plurality of magnets are provided as a plastic magnet that is magnetized.

13. The linear position sensor according to claim 1, wherein the detection object includes a shaft longer than the yoke in the stroke direction, and the yoke is fixed to an outer peripheral surface of the shaft.

14. A linear position sensor configured to detect a position of a detection object in a stroke direction, the detection object being organized such that a plurality of magnets are spaced apart from each other along the stroke direction, and such that adjacent magnetic pole surfaces of the plurality of magnets have opposite poles, the linear position sensor comprising:

a detector arranged with a gap in a gap direction against a magnetic pole surface of each of the plurality of magnets, the detector configured to acquire, as a detection signal of a phase corresponding to the position of the plurality of magnets, a sine signal representing a sine function and a cosine signal representing a cosine function, based on a change in a magnetic field received from the plurality of magnets according to movement of the detector relative to the detection object in the stroke direction; and a signal processor configured to
    acquire the sine signal and the cosine signal from the detector,
    generate, based on the sine signal and the cosine signal, an arctangent signal that represents an arctangent function and corresponds to a stroke amount of the detection object relative to the detector, and
    acquire the arctangent signal as a position signal that indicates the position of the detection object, wherein the detection object includes a yoke that is magnetic and having one surface, the yoke has a mounting portion at a position between adjacent ones of the plurality of magnets, the mounting portion protrudes in a direction, which is of directions of the one surface and perpendicular to the stroke direction, and the mounting portion includes an overlapping portion overlapping with a part of the plurality of magnets in a vertical direction.

\* \* \* \* \*